(12) United States Patent
Aliabadi et al.

(10) Patent No.: US 7,412,409 B2
(45) Date of Patent: Aug. 12, 2008

(54) ONLINE ORDERING MEDIUM AND METHOD

(75) Inventors: Amir Aliabadi, Issaquah, WA (US);
Noreen Dalton, New York, NY (US);
Anargiros Zacharias Frangos, Jr.,
Chappaqua, NY (US); Jeffrey T. Hammond, Anthem, AZ (US);
Courtney Ann Licardi, Peoria, AZ (US); Becky Sutton, Peoria, AZ (US);
Martin Tarvydas, Bellevue, WA (US)

(73) Assignee: American Express Travel Related Services Company, Inc., New York, NY (US)

( * ) Notice: Subject to any disclaimer, the term of this patent is extended or adjusted under 35 U.S.C. 154(b) by 0 days.

(21) Appl. No.: 11/125,593

(22) Filed: May 9, 2005

(65) Prior Publication Data

US 2005/0273396 A1 Dec. 8, 2005

Related U.S. Application Data

(63) Continuation-in-part of application No. 09/882,368, filed on Jun. 15, 2001.
(60) Provisional application No. 60/521,507, filed on May 7, 2004, provisional application No. 60/212,103, filed on Jun. 15, 2000.

(51) Int. Cl.
*G06Q 30/00* (2006.01)
(52) U.S. Cl. .......................................... 705/26; 705/27
(58) Field of Classification Search .................... 705/26, 705/27
See application file for complete search history.

(56) References Cited

U.S. PATENT DOCUMENTS

| 5,537,586 | A | | 7/1996 | Amram et al. |
| 5,710,884 | A | | 1/1998 | Dedrick |
| 5,710,887 | A | * | 1/1998 | Chelliah et al. ............... 705/26 |
| 5,754,981 | A | | 5/1998 | Veeneman et al. |

(Continued)

FOREIGN PATENT DOCUMENTS

| WO | WO 98/04976 | 2/1998 |
| WO | WO 00/31657 | 6/2000 |

OTHER PUBLICATIONS

"SmartShop.com Simplifies the Online Shopping Experience; New Site Promises to Redefine Internet Shopping," Business Editors; Business Wire; Nov. 29, 1999.*

(Continued)

*Primary Examiner*—Jeffrey A. Smith
*Assistant Examiner*—Jason B. Dunham
(74) *Attorney, Agent, or Firm*—Snell & Wilmer L.L.P.

(57) ABSTRACT

Systems and methods for facilitating an on-line purchase of at least one item on behalf of a consumer are disclosed. A consumer may shop and request purchase of at least one item on a consolidated shopping (CS) website displaying one or more items available for purchase on one or more different merchant websites. A host computer providing the CS website may access a merchant website selling the requested item, and order the requested item on behalf of the consumer, and charging a transaction fee, listing fee, receiving a rebate and/or offering a rebate for performing such. One embodiment allows a consumer to purchase/order multiple items from multiple websites in a single purchase request to the CS website.

18 Claims, 16 Drawing Sheets

U.S. PATENT DOCUMENTS

| | | | |
|---|---|---|---|
| 5,774,874 A | 6/1998 | Veeneman et al. | |
| 5,799,157 A | 8/1998 | Escallon | |
| 5,862,223 A | 1/1999 | Walker et al. | |
| 5,878,141 A | 3/1999 | Daly et al. | |
| 5,960,411 A | 9/1999 | Hartman et al. | |
| 5,966,697 A | 10/1999 | Fergerson et al. | |
| 5,970,474 A | 10/1999 | LeRoy et al. | |
| 5,987,440 A | 11/1999 | O'Neil et al. | |
| 6,023,683 A | 2/2000 | Johnson et al. | |
| 6,029,141 A * | 2/2000 | Bezos et al. | 705/27 |
| 6,055,516 A | 4/2000 | Johnson et al. | |
| 6,101,482 A | 8/2000 | DiAngelo et al. | |
| 6,125,353 A | 9/2000 | Yagasaki | |
| 6,182,127 B1 | 1/2001 | Cronin, III et al. | |
| 6,192,380 B1 | 2/2001 | Light et al. | |
| 6,199,079 B1 | 3/2001 | Gupta et al. | |
| 6,256,623 B1 | 7/2001 | Jones | |
| 6,320,952 B1 | 11/2001 | Bruno et al. | |
| 6,327,598 B1 | 12/2001 | Kelley et al. | |
| 6,334,114 B1 | 12/2001 | Jacobs et al. | |
| 6,345,278 B1 | 2/2002 | Hitchcock et al. | |
| 6,490,602 B1 | 12/2002 | Kraemer | |
| 6,496,855 B1 | 12/2002 | Hunt et al. | |
| 6,499,042 B1 | 12/2002 | Markus | |
| 6,499,052 B1 | 12/2002 | Hoang et al. | |
| 6,505,172 B1 | 1/2003 | Johnson et al. | |
| 6,510,459 B2 | 1/2003 | Cronin, III et al. | |
| 6,535,880 B1 | 3/2003 | Musgrove et al. | |
| 6,578,011 B1 * | 6/2003 | Forward | 705/14 |
| 6,594,644 B1 | 7/2003 | Van Dusen | |
| 6,629,135 B1 | 9/2003 | Ross, Jr. et al. | |
| 6,643,624 B2 * | 11/2003 | Philippe et al. | 705/26 |
| 6,725,222 B1 | 4/2004 | Musgrove et al. | |
| 6,772,139 B1 | 8/2004 | Smith, III | |
| 6,856,963 B1 | 2/2005 | Hurwitz | |
| 6,892,185 B1 | 5/2005 | Van Etten et al. | |
| 6,895,388 B1 | 5/2005 | Smith | |
| 7,047,211 B1 | 5/2006 | Van Etten et al. | |
| 7,058,598 B1 | 6/2006 | Chen et al. | |
| 7,185,069 B2 | 2/2007 | Costin et al. | |
| 2001/0011250 A1 | 8/2001 | Paltenghe et al. | |
| 2001/0016828 A1 * | 8/2001 | Philippe et al. | 705/26 |
| 2002/0002496 A1 | 1/2002 | Miller et al. | |
| 2002/0174018 A1 * | 11/2002 | Bunger et al. | 705/26 |
| 2002/0194125 A1 | 12/2002 | Shimada | |
| 2003/0093321 A1 * | 5/2003 | Bodmer et al. | 705/26 |

OTHER PUBLICATIONS

"SmartShop.com Simplifies the Online Shopping Experience; New Site Promises to Redefine Internet Shopping," Business Editors; Business Wire; Nov. 29, 1999.

Lemay, Laura; Java 1.1: Interactive Course, 1997, The Waite Group.

Cozzens, Lisa; JavaScript Tutorial, http://www.cs.brown.edu/courses/bridge/1998/res/javascript-tutorial.html, 1998.

Printout of Website for About eWallet, http://www.ewallet.com, Jan. 11, 1999, 4 pages.

Printout of Website for Transactor Networks (CitiWallet), http://www.transactor.net.com, Jan. 11, 1999, 4 pages.

alexa.com screen captures via the WayBackMachine (archieve.org) and dated Feb. 29, 2000.

Sirbu, Marvin, et al., "NetBill: An Internet Commerce System Optimized for Network-Delivered Services," IEEE Personal Communications, 34-39, Aug. 1995.

Unknown: "Gator offers one-click shopping at over 5,000 e-commerce sites today," Internet Publication, origin unknown, Jan. 14, 1999.

Unknown: "E-Commerce Leaders Announce Universal Formats for Simplified Online Payments," Internet Publication, origin unknown, Jun. 14, 1999.

Cingil, "Supporting Global User Profiles Through Trusted Authorities," Data Management Issues in Electronic Commerce, vol. 31, issue 1, Mar. 200, pp. 11-17.

Anonymous, "CDW Computer Centers: CDW Computer Centers Takes Online Shopping to the Next Level," Business Wire, May 18, 1998.

Bonisteel, S., "Company Sees One Shoping 'Basket' for Entire Web Oct. 28, 1999," Newsbytes, Oct. 28, 1999.

Anonymous, "BuyerZone.com Announces Most Advanced eCommerce System for Small to Mid-Sized Buisnesses," Business Wire, Dec. 13, 1999.

* cited by examiner

ONLINE ORDERING MEDIUM AND METHOD

CROSS-REFERENCE TO RELATED APPLICATIONS

This application claims priority to and the benefit of U.S. Provisional Patent Application Ser. No. 60/521,507, filed on May 7, 2004. This application is also a continuation-in-part of, and claims priority to, U.S. application Ser. No. 09/882, 368 filed on Jun. 15, 2001, and claims priority to U.S. Provisional Application No. 60/212,103, filed Jun. 15, 2000, all of which are hereby incorporated by reference.

FIELD OF THE INVENTION

The invention generally relates to on-line purchases made by a consolidated shopping website, and more particularly, to receiving compensation for facilitating on-line purchases in a single transaction as perceived by the consumer.

BACKGROUND OF THE INVENTION

With the proliferation of the Internet, more and more consumers are purchasing items on-line. Historically, if a consumer wanted to purchase, for example, clothing and auto parts on-line, the consumer either went to one website for the clothing and a different website for the auto parts, or to a single website selling both clothing and auto parts (e.g., www.sears.com). In the latter instance, if the consumer needs a type of clothing (e.g., a tuxedo) which is not available, and auto parts (e.g., tires) that are available, the consumer must still purchase the clothing and the auto parts from different websites.

Websites currently exist (e.g., www.froogle.com and www.mysimon.com) that consolidate catalogs from one or more merchants. However, these websites do not provide an integrated shopping experience since they refer the consumer to another website to purchase a specific item. In other words, these websites transfer the consumer to a different website that sells the particular item(s) the consumer wishes to purchase, so that the consumer may then purchase the item on the transferee website. Returning to the example above, if the consumer wishes to purchase the tuxedo and the tires, the consumer must complete two separate purchases. Thus, for items not sold on a single website, current methods and systems still require the consumer to purchase the items on two separate websites in two separate transactions.

Therefore, systems and methods are needed to enable a host computer providing a consolidated shopping website to order at least one item from at least one different merchant website on behalf of a consumer. Additionally, there is a need for systems and methods to provide compensation to an entity providing a service that allows a consumer to order multiple items sold on multiple websites in a "single transaction" as perceived by the consumer.

SUMMARY OF THE INVENTION

The invention relates to an interactive website that may include item information from one or more merchants in order to present consumers with an integrated online shopping experience. In one embodiment, item information is provided directly from the merchant via any network, webpage, communication device, protocol or method discussed herein, and stored in any of the databases also discussed herein.

Further embodiments of the invention relate to systems and methods to facilitate an on-line purchase of at least one item on behalf of a consumer. A host computer may provide a consolidated shopping (CS) website displaying one or more items available for purchase on at least one merchant website which is separate from the CS website. The host computer may receive a request from a consumer to purchase at least one item displayed on the CS website, and order the item on behalf of the consumer from one or more merchant websites selling the item and the host computer may receive compensation for providing such service.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF EXEMPLARY EMBODIMENTS

Exemplary embodiments of the present invention will now be described with reference to the accompanying drawings and figures. These exemplary embodiments are described in sufficient detail to reveal the best mode of implementing the invention, and to enable those skilled in the art to practice the invention. It should be understood, however, that other embodiments may be realized and that logical and mechanical changes may be made without departing from the spirit and scope of the invention. Thus, the detailed description herein is presented for purposes of illustration only and not of limitation. For example, the steps recited in any of the method or process descriptions may be executed in any order and are not limited to the order presented.

For the sake of brevity, conventional data networking, application development and other functional aspects of the systems (and components of the individual operating components of the systems) need not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

Figure 1:
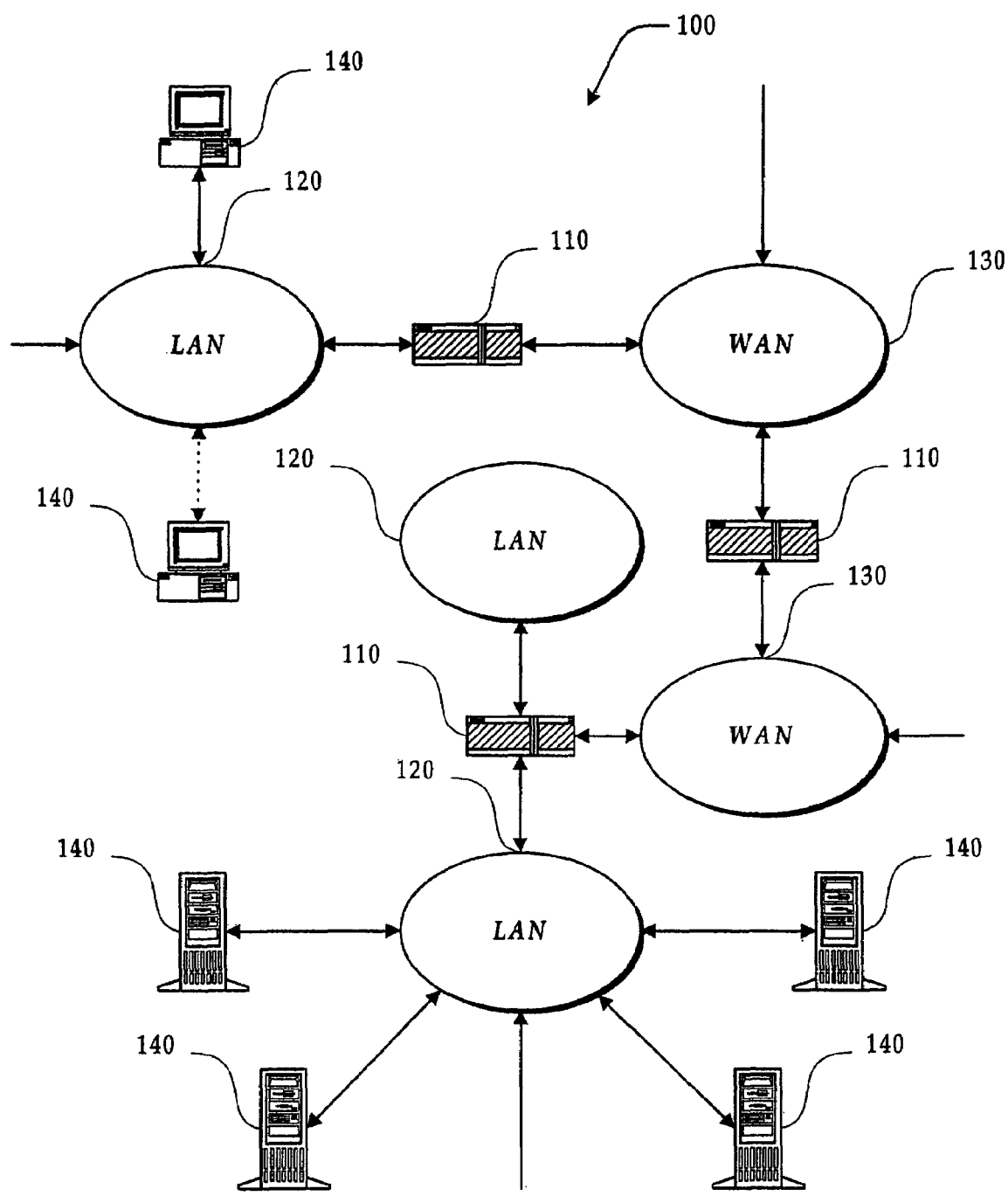
FIG. 1 is an illustration of a representative portion of an internetwork such as the Internet.

As will be better understood from the following description, the present invention is embodied at least in part in a Web site accessible via the Internet. As is well known by those skilled in the art, the term "Internet" refers to the collection of networks and routers that use the transmission control protocol/internet protocol ("TCP/IP") or next generation protocols to communicate with one another. A representative section of the Internet 100 is shown in FIG. 1. A plurality of local area networks ("LANs") 120 in a wide area network ("WAN") 130 are interconnected by routers 110. The routers 110 are special purpose computers used to interface one LAN or WAN to another. Communication links within the LANs may be twisted wire, coaxial cable, fiber-optic, wireless links or other communication links known to those skilled in the art. While communication links between networks may utilize analog telephone lines, digital lines, fiber-optic, wireless or other communication links known to those skilled in the art. Furthermore, computers, such as remote computers 140, and other related electronic devices such as telephones, personal digital assistants ("PDAs"), etc., can be remotely connected to either the LANs 120 or WANs 130 via a modem (not shown) and a temporary communication link, such as a telephone line or wireless connection (shown as a dotted line). As will be appreciated by those of ordinary skill in the art, the Internet 100 comprises a vast number of such interconnected networks, computers, and routers and that only a small, representative portion is shown in FIG. 1.

The Internet 100 has recently seen explosive growth by virtue of its ability to link computers located throughout the world. As the Internet 100 has grown, so has the Web. As will be readily appreciated by those skilled in the art, the Web is a vast collection of interconnected or "hypertext" documents formatted in the HyperText Markup Language ("HTML") or other markup languages that are electronically stored at Web sites throughout the Internet 100. A Web site resides on a server computer such as the import server 400 illustrated in FIG. 4 connected to the Internet 100 that has storage facilities for storing hypertext documents and that runs Web server software 460 for handling requests for those stored hypertext documents. A hypertext document normally includes a number of hyperlinks, usually displayed on a monitor as highlighted portions of text, which link the document to another hypertext document stored at the same Web site or some other Web site located elsewhere on the Internet 100. Each hyperlink is associated with a Uniform Resource Locator ("URL") that provides the location of the linked document on the Web server connected to the Internet. Thus, whenever a hypertext document is retrieved from any Web server, the document is considered to be retrieved from the Web. As is known to those skilled in the art, a Web server may also include facilities for storing and transmitting application programs, such as application programs written in the JAVA.RTM. programming language from Sun Microsystems for execution on a remote computer. Likewise, a Web server may also include facilities for executing scripts and other programs on the Web server itself.

A consumer or other remote user may retrieve hypertext documents from the Web via a Web browser application program. A Web browser, such as the NETSCAPE NAVIGATOR.RTM. browser or the MICROSOFT.RTM. Internet Explorer browser, is a software application program for providing a user interface with the Web. Upon request from the consumer via the Web browser, the Web browser accesses and retrieves the desired hypertext document from the appropriate Web server using the URL for the document and a protocol known as hypertext transfer protocol ("HTTP"). HTTP is a higher level protocol than TCP/IP and is designed specifically for the requirements of the Web. It is used on top of TCP/IP to transfer hypertext documents between servers and clients. The Web browser may also retrieve application programs from the Web server, such as JAVA applets, for execution on the consumer device 300. It will be appreciated by those skilled in the art that protocols other than HTTP may be used. For example, a URL might designate the file transfer protocol ("FTP") or Secure HyperText Transfer Protocol ("HTTPS").

The present invention is directed to providing a UPPS allowing the ordering and purchasing of items from many different merchants on the Internet. One embodiment of the invention provides a UPPS having a common user interface. The common user interface allows the consumer to purchase items from different merchants using the same user interface. For example, if a consumer is searching for books, videos and appliances, the consumer will likely be presented with books, videos and appliances from several different merchants. The consumer, however, will be able to order Book A from Merchant A, and Book B from Merchant B using the same ordering form.

Figure 2:
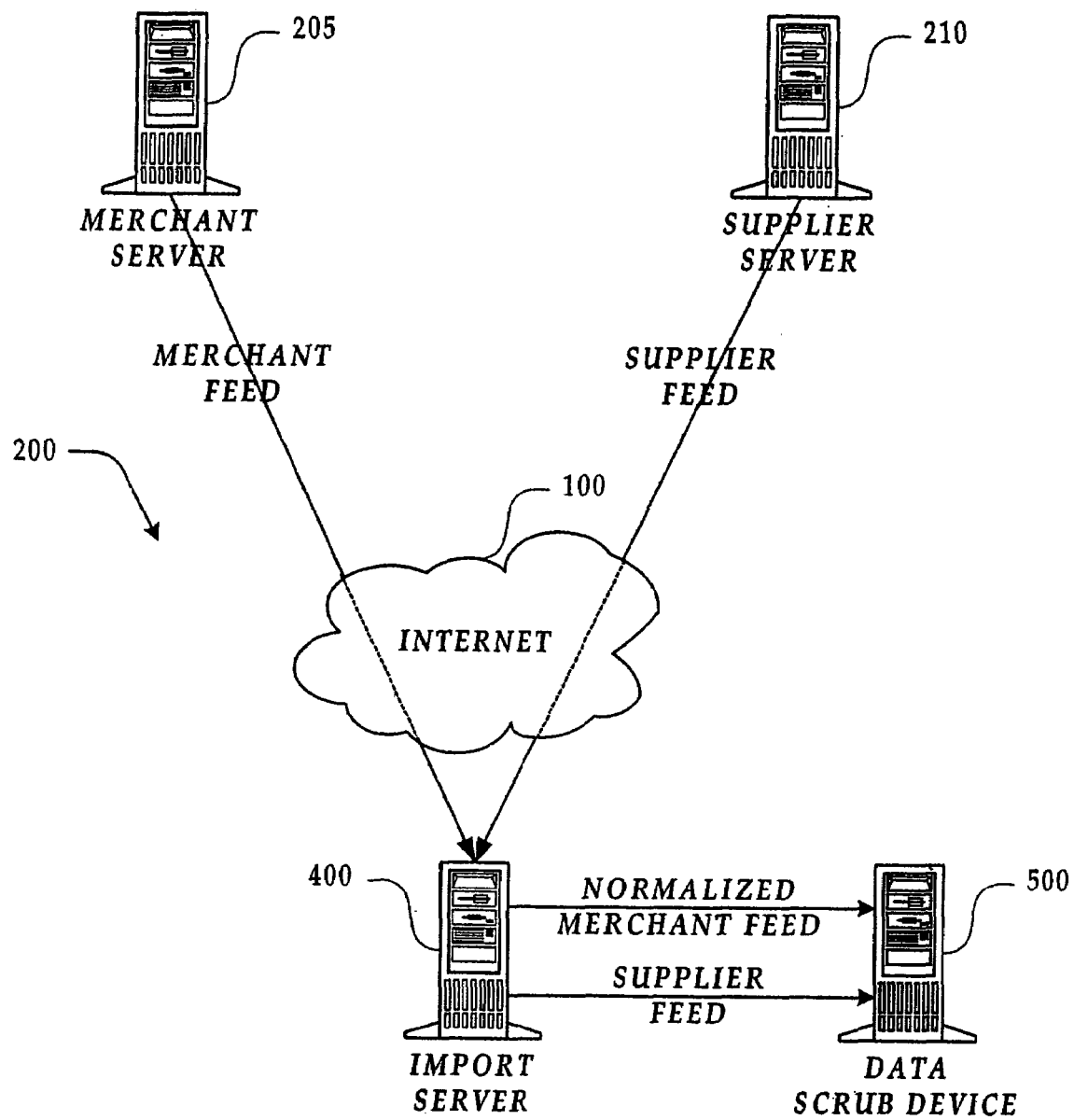
FIG. 2 is a pictorial diagram of a number of devices connected to an internetwork for processing item data from merchants or suppliers in accordance with the present invention.

A system 200 of computers and devices to which the import server 400 and data scrub device 500 are also connected is shown in detail in FIG. 2. In addition to the data scrub device 500 and the import server 400, the system 200 includes at least one supplier server 210 and at least one merchant server 205. Moreover, those of ordinary skill in the art will recognize that while only one data scrub device 500, one import server 400, one merchant server 205 and one supplier server 210 are depicted in FIG. 2, numerous merchant servers 205, supplier servers 210, import servers 400 and data scrub devices 500 may be interconnected to operate in accordance with the present invention.

In one embodiment of the invention, the import server 400 generates webpages containing item information that can be viewed by the consumer using standard Web browsers. In another embodiment, the import server 400 creates a network presence, in which the import server 400 sends a customized data stream containing item and merchant information over the network to the consumer devices 300. The consumer device 300 uses a Web browser to provide a user interface configured to accept the data stream and to allow the consumer to search for and view item information, select items, and order items all using the same interface.

Figure 3:
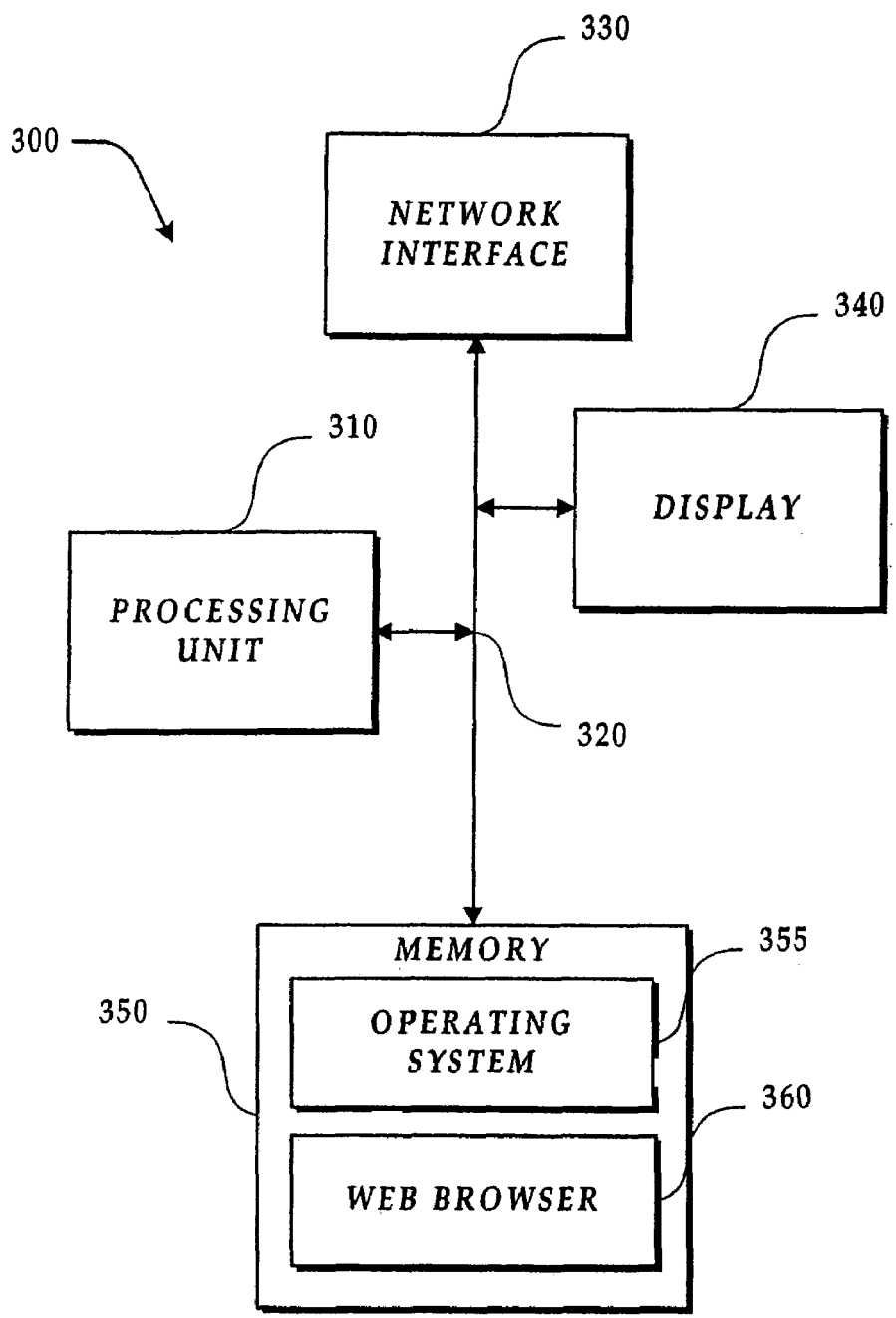
FIG. 3 is a block diagram illustrating several of the components of a consumer device.

FIG. 3 depicts several of the key components of a consumer device 300 used by a consumer to order items via the Internet in accordance with the present invention. Those of ordinary skill in the art will appreciate that the consumer device 300 includes many more components than those shown in FIG. 3. However, it is not necessary that all of these generally conventional components be shown in order to disclose an illustrative embodiment for practicing the present invention. As shown in FIG. 3, the consumer device 300 includes a network interface unit 330 for connecting to a LAN 120 or WAN 130. As will be appreciated by those of ordinary skill in the art, the network interface unit 330 includes the necessary circuitry for such a connection, and is also constructed for use with the TCP/IP protocol, the particular network configuration of the LAN 120 or WAN 130 it is connecting to, and a particular type of coupling medium. Alternatively, the consumer device 300 may also be equipped with a modem for connecting to the Internet through a point to point protocol ("PPP") connection or a serial line Internet protocol ("SLIP") connection as known to those skilled in the art.

The consumer device 300 also includes a central processing unit 310, a display 340 and a memory 350 connected via a bus 320. The memory 350 generally comprises random access memory ("RAM"), and read-only memory ("ROM") and a persistent mass storage device such as a hard disk drive. The memory 350 stores an operating system 355 for controlling the operation of the consumer device 300. The memory 350 also includes a Web browser 360, such as the NETSCAPE NAVIGATOR.RTM. browser or the MICROSOFT.RTM. Internet Explorer browser, for accessing the Web. Web browser 360 may also store a JAVA virtual machine used to execute JAVA "applets" as known to those skilled in the art. It will be appreciated that these components may be stored on a computer-readable medium and loaded into memory 350 of the consumer device 300 using a drive mechanism associated with the computer-readable medium, such as a floppy or a CD-ROM/DVD-ROM drive or the network adapter 330.

Although in one embodiment the consumer device 300 is a personal computer, those of ordinary skill in the art will appreciate that the consumer device 300 could be a wireless device such as a pager, a cellular telephone, Web-enabled landline telephone, PDA or any other type of consumer device 300 capable of communicating with the import server 400.

Figure 4:
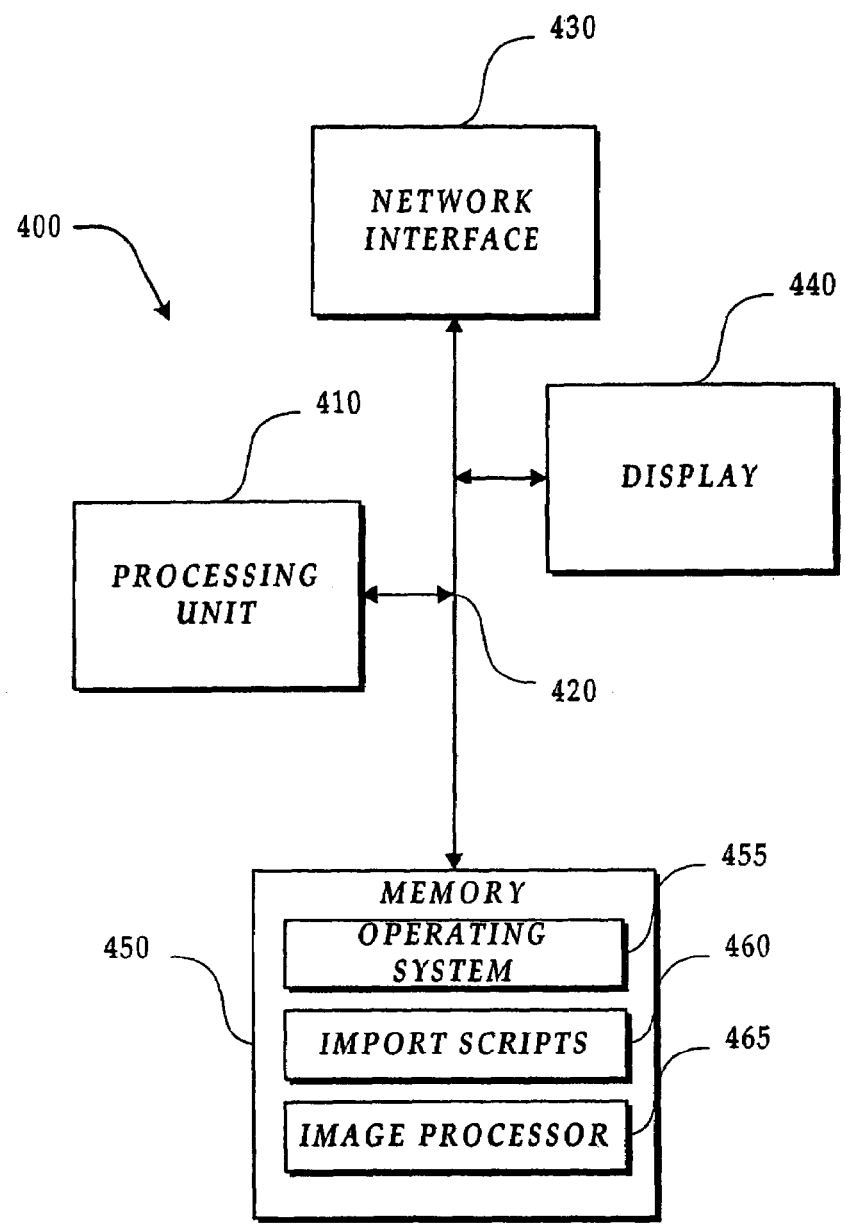
FIG. 4 is a block diagram illustrating several of the components of an import server.

FIG. 4 depicts several of the components of an import server 400 used to implement the present invention. Those of ordinary skill in the art will appreciate that the import server 400 includes many more components than those shown in FIG. 4. However, it is not necessary that all of these generally conventional components be shown in order to disclose an illustrative embodiment for practicing the present invention. As shown in FIG. 4, the import server 400 is connected to the Internet 100, or other communications network, via a network interface unit 430. Those of ordinary skill in the art will appreciate that the network interface unit 430 includes the necessary circuitry for connecting the import server 400 to the Internet 100, and is constructed for use with the TCP/IP protocol.

The import server 400 also includes a central processing unit ("CPU") 410, a display 440, and mass memory 450, connected via a bus 420. Mass memory 450 generally comprises RAM, ROM, and some form of persistent mass storage device, such as a hard disk drive, tape drive, optical drive (such as CD-ROM or DVD-ROM), floppy disk drive, or combination thereof. Mass memory 450 stores an operating system 455 for controlling the operation of the import server 400. It will be appreciated that the operating system may be formed by any one of several server operating systems well known to those of ordinary skill in the art, such as UNIX.RTM., MAC OS.RTM. or MICROSOFT.RTM. WINDOWS NT.RTM. In addition, mass memory 450 stores import scripts 460, as well as image processor software 465 for extracting and/or retrieving item images.

Figure 5:
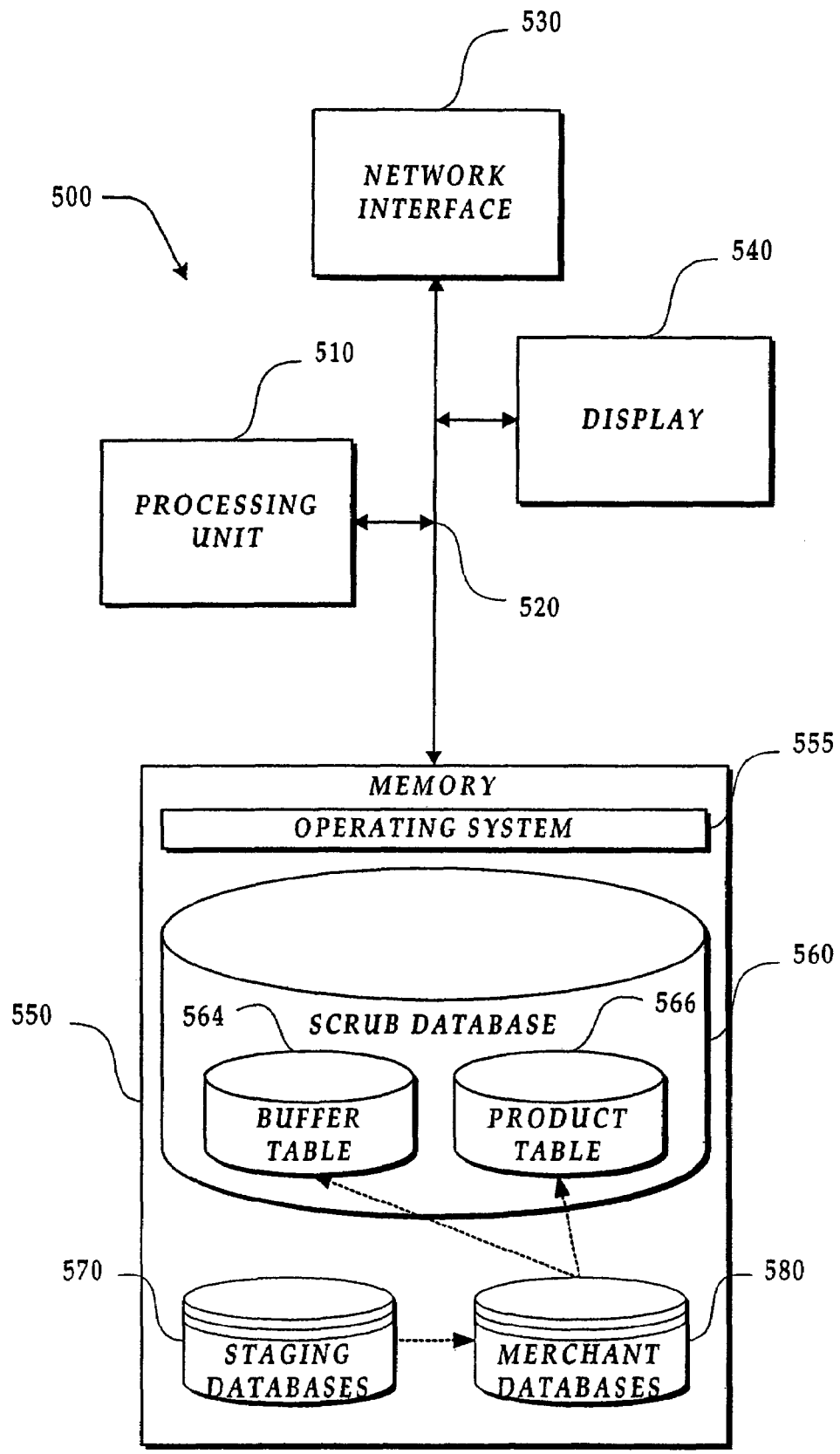
FIG. 5 is a block diagram illustrating several of the components of a data scrub device.

FIG. 5 depicts several of the key components of an exemplary data scrub device 500 used to implement the present invention. Those of ordinary skill in the art will appreciate that the data scrub device 500 includes many more components than those shown in FIG. 5. However, it is not necessary that all of these generally conventional components be shown in order to disclose an illustrative embodiment for practicing the present invention. As shown in FIG. 5, the data scrub device 500 includes a network interface unit 530 for connecting to a LAN 120 or WAN 130 (FIG. 1). As will be appreciated by those of ordinary skill in the art, the network interface unit 530 includes the necessary circuitry for such a connection, and is also constructed for use with the TCP/IP protocol, the particular network configuration of the LAN 120 or WAN 130 it is connecting to, and a particular type of coupling medium. Alternatively, the data scrub device 500 may also be equipped with a modem for connecting to the Internet through a PPP connection or a SLIP connection as known to those skilled in the art.

The data scrub device 500 also includes a central processing unit 510, a display 540 and a memory 550 connected via a bus 520. The memory 550 generally comprises RAM, and ROM and a persistent mass storage device such as a hard disk drive. The memory 550 stores an operating system 555 for controlling the operation of the data scrub device 500. The memory 550 also includes a scrub database 560, staging database 570 and merchant databases 580. Scrub database 560 in turn comprises an item table 566 and a buffer table 564. It will be appreciated that these components may be stored on a computer-readable medium and loaded into memory 550 of the data scrub device 500 using a drive mechanism associated with the computer-readable medium, such as a floppy or a CD-ROM/DVD-ROM drive or the network adapter 530. In one embodiment of the invention, some of the components of the data scrub device 500 may be part of the import server 400 (FIGS. 2, 4).

Figure 6:
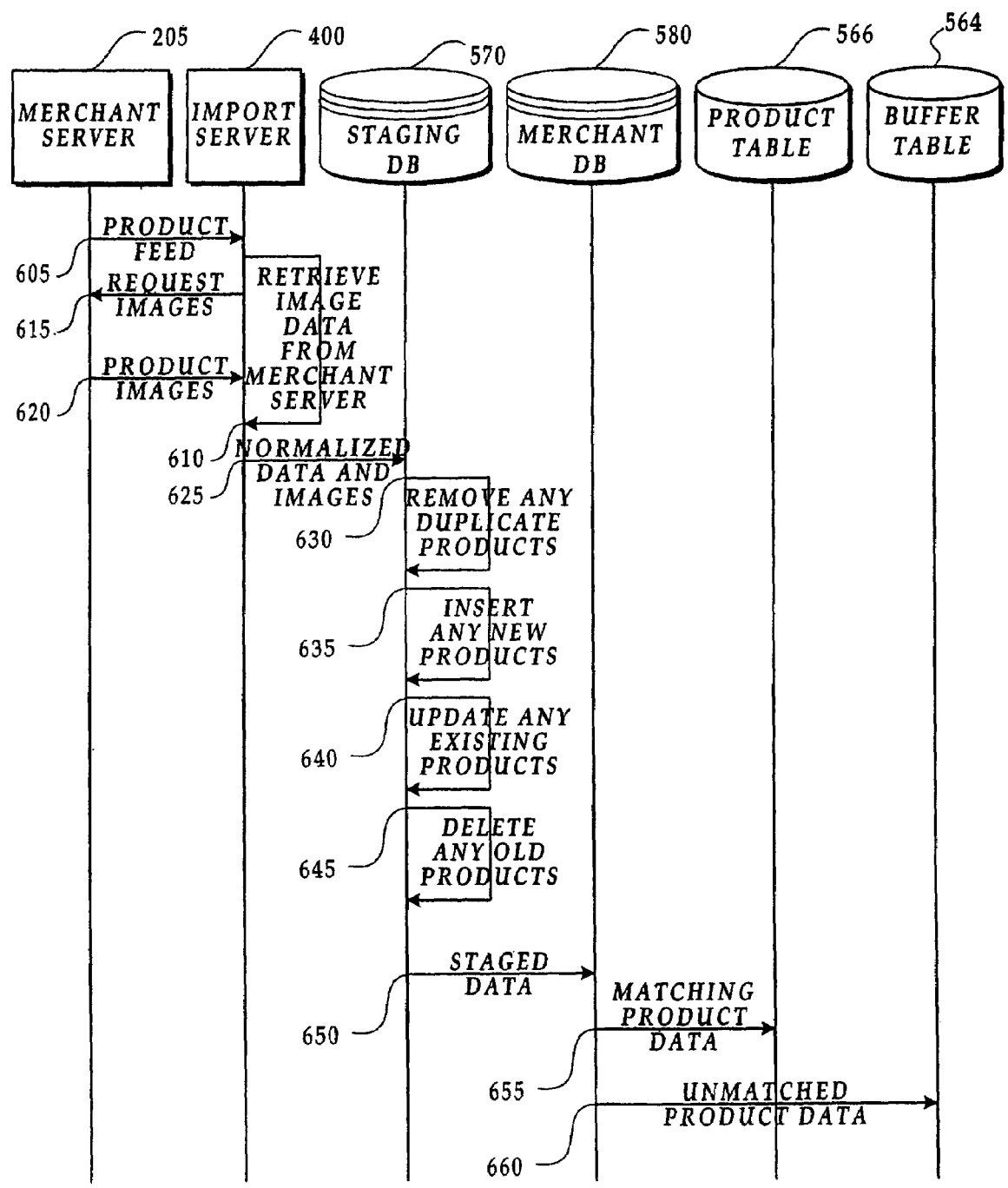
FIG. 6 is a diagram illustrating the actions taken by a merchant server, an import server, a staging database, a merchant database, an item table and a buffer table to gather item information to allow a consumer to purchase items and/or services using a UPPS in accordance with the present invention.

FIG. 6 illustrates the actions taken by the merchant server 205, import server 400, staging databases 570, merchant databases 580, item table 566 and buffer table 564 to gather item information to enable searching, viewing and purchasing through the UPPS hereinafter referred as UPPS in accordance with the present invention. (Both the staging databases 570 and merchant databases 580 have a separate database for each merchant or supplier of item data. Accordingly, when referring to a single merchant or supplier, the staging databases 570 and merchant database 580 will be referred to in the singular.) The interactions of the various components are illustrated and described in greater detail later with reference to diagrams shown in FIGS. 8 and 9. Returning to FIG. 6, the item data import process is initiated when a merchant server 205 provides an item feed 605 to an import server 400. The import server 400 is then able to retrieve 610 image data from the merchant server that relates to the items described in the item feed. The import server requests images 615 from the merchant server and receives item images 620 back from the merchant server. The item feed in the form of normalized data and images 625 is then forwarded to the staging databases 570. The staging database is where duplicate items are removed 630, new items are inserted 635, existing items are updated 640, and old items are deleted 645. Next, the information from the particular staging database 570 associated with the originating merchant server 205 forwards the staged normalized data which is just the normalized data feed that has been updated with the information and processing performed on that particular staging database 570. This staged data 650 is passed to the merchant databases and in particular to the merchant database 580 associated with the originating merchant server 205. The merchant database 580 then forwards 655 matching item data to the item table 566 and forwards unmatched item data 660 to the buffer table 564. Matching and unmatched item data will be discussed in greater detail below with regard to FIG. 9.

Figure 7:
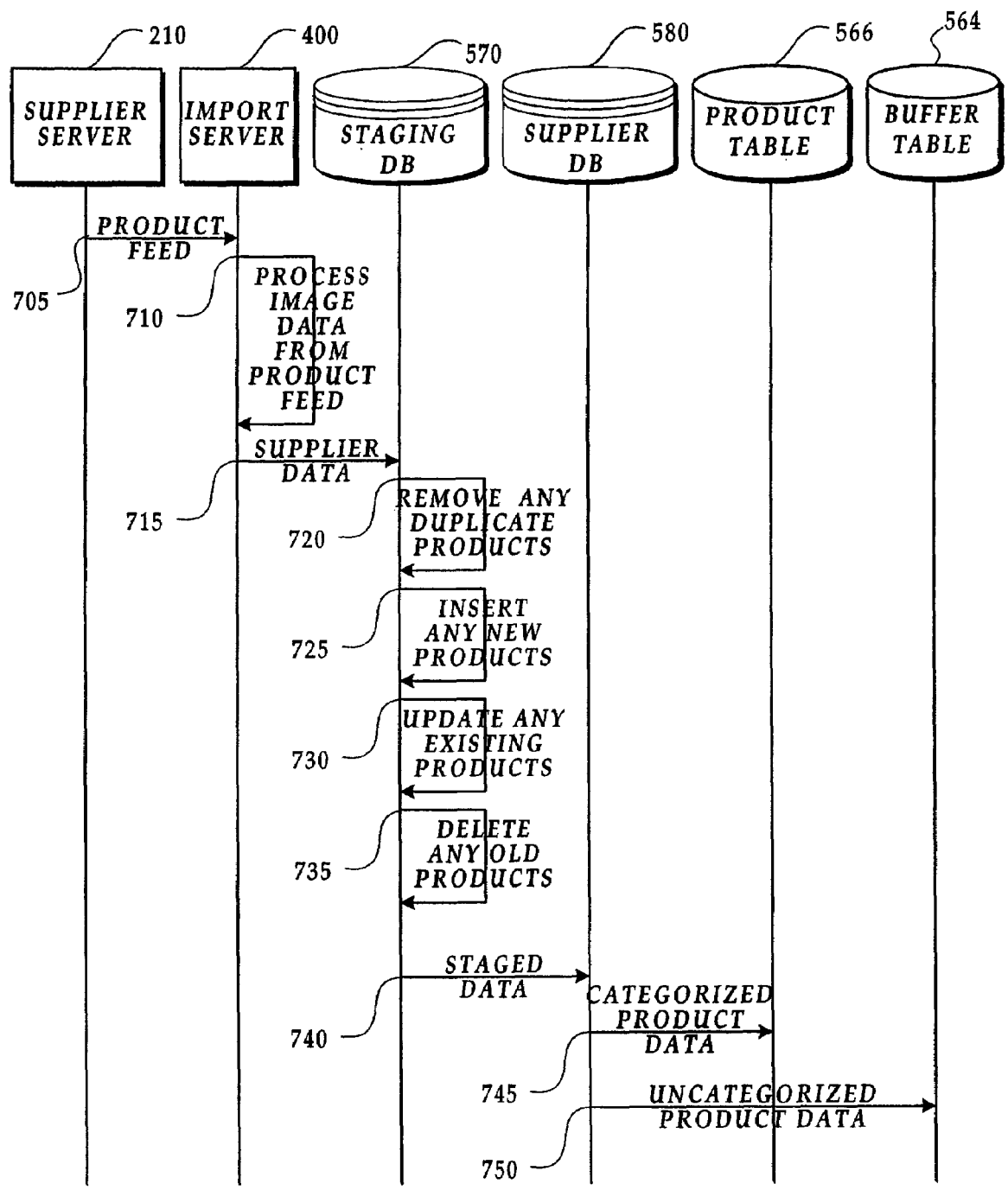
FIG. 7 is a diagram illustrating the actions taken by a supplier server, an import server, a staging database, a merchant database, an item table and a buffer table to gather item information to allow a consumer to purchase items and/or services using a UPPS in accordance with the present invention.

FIG. 7 illustrates the actions taken by the supplier server 210, import server 400, staging databases 570, merchant databases 580, item table 566 and buffer table 564 to gather item information to enable searching, viewing and purchasing through the UPPS hereinafter referred as UPPS in accordance with the present invention. The interactions of the various components are illustrated and described in greater detail later with reference to diagrams shown in FIGS. 8 and 9. Returning to FIG. 7, the item data import process is initiated when a supplier server 210 provides an item feed 705 to an import server 400. The import server 400 is then able to extract and process 710 image data from the item feed that relates to the items described in the item feed. The item feed in the form of supplier (normalized) data and images 715 are then forwarded to the staging databases 570. The staging database 570 is where duplicate items are removed 720, new items are inserted 725, existing items are updated 730, and old items are deleted 735. Next, the information from the particular staging database 570 associated with the originating supplier server 210 forwards the staged normalized data which is just the normalized data feed that has been updated with the information and processing performed on that particular staging database 570. This staged data 740 is passed to the merchant (in this case also supplier) databases 580 and in particular to the merchant database 580 associated with the originating supplier server 210. The merchant database 580 then forwards 745 categorized item data to the item table 566 and forwards uncategorized item data 750 to the buffer table 564.

It will be appreciated by those of ordinary skill in the art that the order of the operations in FIG. 6 or 7 may be altered without substantially affecting the operation of the present invention. For example, the merchant database 580 may be incorporated into the staging database 570; or some or all of steps 630-645 may be performed in other orders or even on the merchant database 580.

Figure 8:
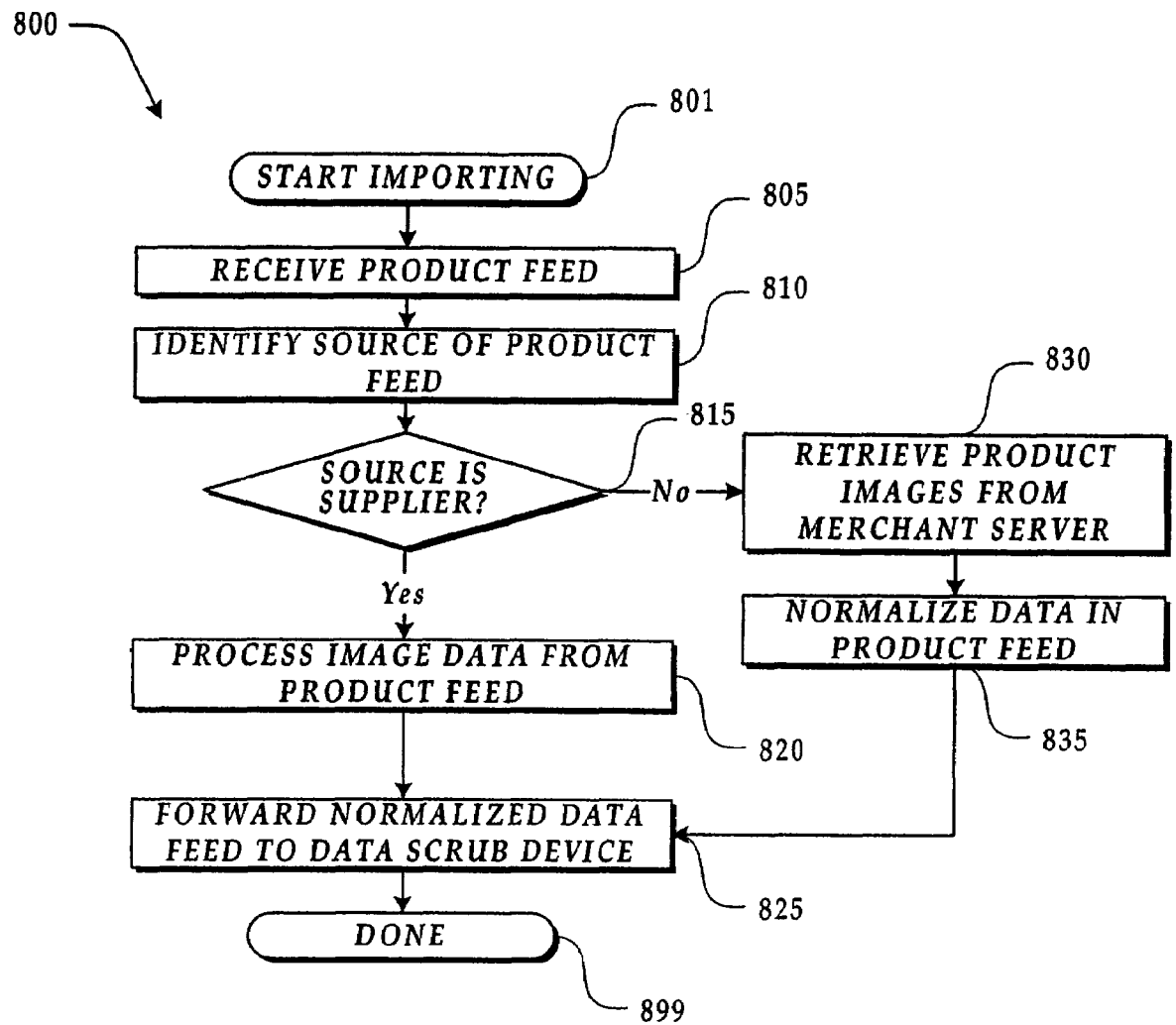
FIG. 8 is an overview flow diagram illustrating a process for importing item data from an item feed into an import server.

The present invention is directed to providing a shopping service that obtains items for a consumer across many different merchant sites while maintaining a consistent user interface for the consumer no matter from which merchant the items are retrieved or obtained. Instead of redirecting the consumer to an external site when the consumer selects an item located on an external merchant site, the import server 400 maintains control of the consumer throughout the entire shopping process. Accordingly, FIG. 8 illustrates an exemplary logic routine 800 illustrating importing item data from an item feed into an import server 400 in accordance with the present invention. Routine 800 starts at block 801 and proceeds to block 805 where the item feed is received. Next, in block 810, the identity of the source of the item feed (e.g., merchant or supplier) is found from the item feed itself or from the address from which it was received (e.g. a URL for the supplier website). If the source of the item feed in decision block 815 is determined to be a supplier, then in block 820, image data is extracted and processed from embedded images within the item feed. In block 825, the supplier item feed which was received in a normalized form is forwarded to the data scrub device. If, however, in decision block 815, it was determined that the source of the item feed was not a supplier, then the flow goes to block 830 where item images have to be retrieved from the merchant server associated with the merchant item feed. In one embodiment of the invention, item information and/or item images are obtained by scraping a merchant server's 205 Website. For a description of scraping please refer to FIG. 14 described below and to commonly owned U.S. patent application Ser. No. 09/237,169 filed Jan. 25, 1999 and entitled WEB SCRAPING ENGINE, which is incorporated herein by reference. In block 835, the merchant item feed is normalized so that it can be incorporated more easily into the databases of the current invention. Included in this normalization are the images retrieved from the merchant server. Processing then continues back to block 825, and the normalized data from the merchant feed now is of the same normalized format as if it had been supplier provided data. Processing then ends at block 899.

Figure 9:
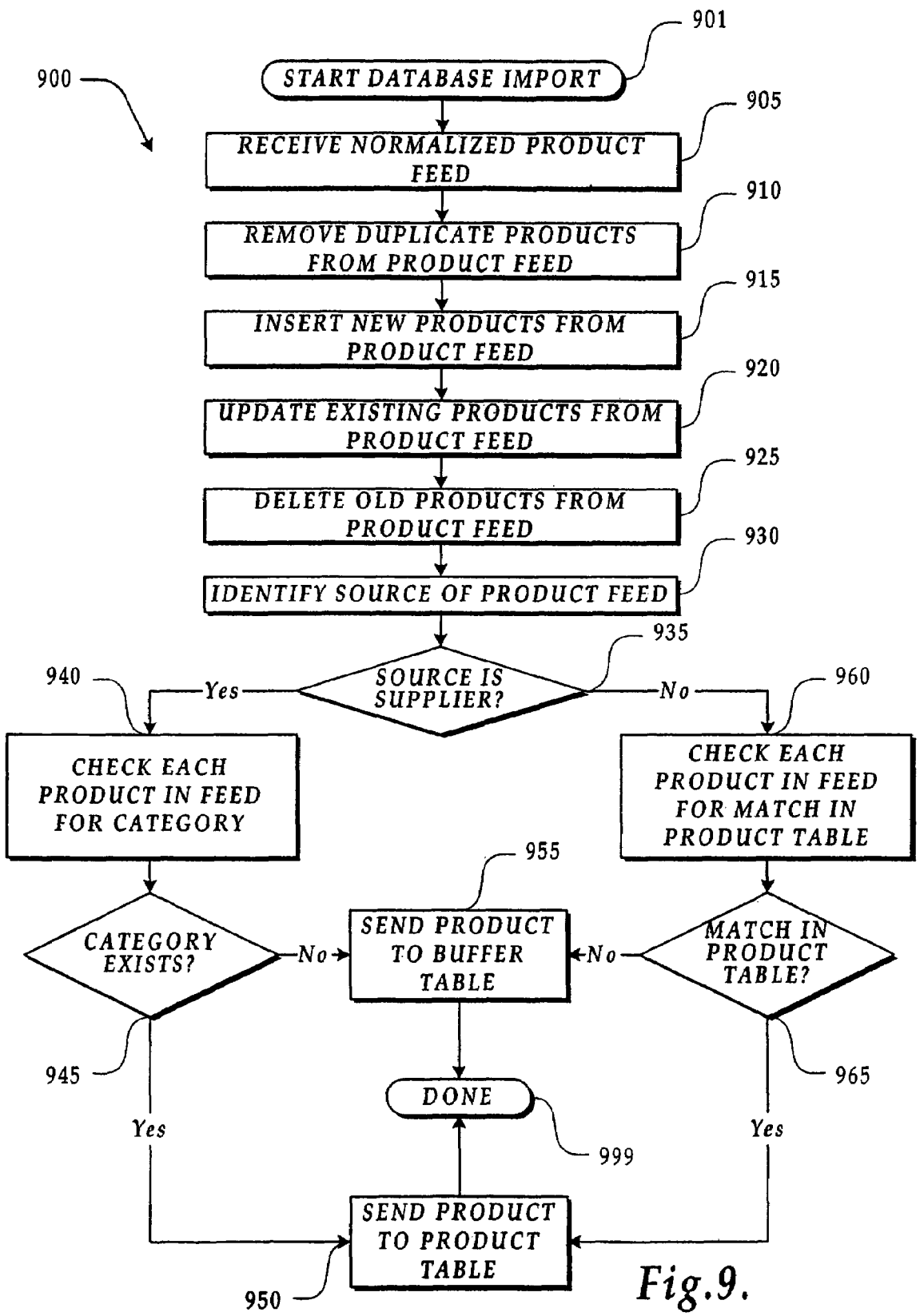
FIG. 9 is an overview flow diagram illustrating a process for importing item data through multiple stage databases from an item feed.

The item feed and any accompanying images have now been normalized for incorporation through the various databases (staging database 570, merchant database 580, and scrub database 560, including buffer table 564 and item table 566 (FIG. 5)) in accordance with the present invention. FIG. 9 illustrates an exemplary logic routine 900 illustrating importing the item data from the item feed through these databases. Routine 900 starts at block 901 and proceeds to block 905 where the normalized item feed is received.

In one exemplary embodiment, the first database receiving the normalized item feed is the staging database 570. However, other databases, such as the merchant database 580, could be the first to receive the normalized item feed. At the database level, duplicate items are removed from the item feed in block 910. In block 915, new items from the item feed are inserted into the database. In block 920, existing items are updated based on the normalized item feed. Next, in block 925, any expired or old items that are no longer in the item feed may be deleted. (It is important to reiterate here that the staging databases 570 and merchant databases 580 are referred to both in the plural and the singular, as the collection of staging databases 570 and the collection of merchant databases 580 contain a separate database each for every supplier and merchant which provide item feeds in accordance with the present invention.)

It will be appreciated by those of ordinary skill in the art that steps 910-925 for updating the databases may be performed in a different order from that depicted in FIG. 9, depending upon specific implementation of the present invention, without departing from the spirit of the invention as specified herein.

Once routine 900 gets to block 930, it then needs to identify the source of the item feed as that will determine how entries in the item feed will be incorporated into the item table and/or buffer table. So, in block 930, the source is identified and in decision block 935, if it is determined that the source of the item data is a supplier, then in block 940, the item entries in the item feed are only checked to see if they have been categorized or that the category already exists in the item table. If, in decision block 945 it is determined that the category exists for an item entry, then that item entry is sent to the item table. If, in block 945 it is determined that the item is uncategorized or that no category exists in the item table that matches the category of the particular item entry, then the item is sent to the buffer table for further processing at a later point, in block 955.

Returning back to decision block 935, if the source is not a supplier, then in block 960, each item entry is checked to see if there is a match in the item database. It will be appreciated by those of ordinary skill in the art that matching item entries in the item feed and item entries in the item table may be done in a myriad of fashions. In one exemplary embodiment, the shopkeeper unit ("SKU") is used to match items in the item feed and the item table. Alternately, in another embodiment, manufacturer name and manufacturer model number may be used to match entries in the item feed and item table 566 (FIG. 5). However, other uniquely identifying information may also be used to match item entries in the item feed to item entries in the item table 566.

Next, in decision block 965, if it is determined that there is a match between an item entry in the item feed and an item entry in the item table, then the item table is updated with the item entry from the item feed, thereby resulting in a more up-to-date entry with regard to that item in the item table 566. If, however, in decision block 965 it is determined that there is no matching item in the item table, then the item entry is forwarded to the buffer table in block 955 for processing at a later point. In any case, processing and of routine 900 ends at block 999.

Once the item feed has been imported into the system of the current invention, including the item table in the scrub database, it will then be used in a commercial side system open to the public; however, this is usually not done directly, rather, the information is sent to devices, servers, and databases accessible by the public, using the item table as a master source of sorts.

Figure 10:
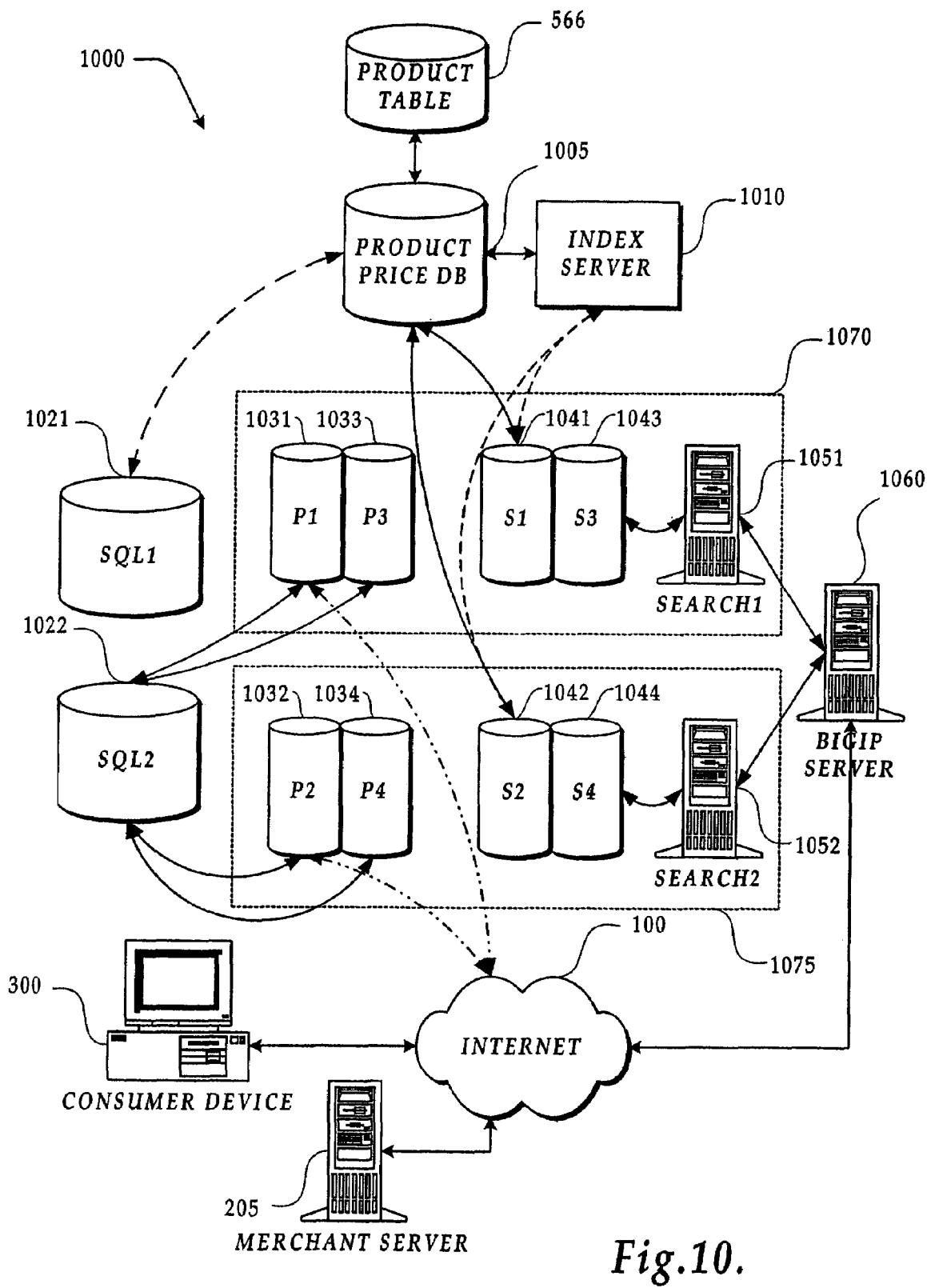
FIG. 10 is a pictorial diagram of a number of devices connected to an internetwork which allow a consumer device also connected to the internetwork to purchase items and/or services in accordance with the present invention.
Figure 11A:
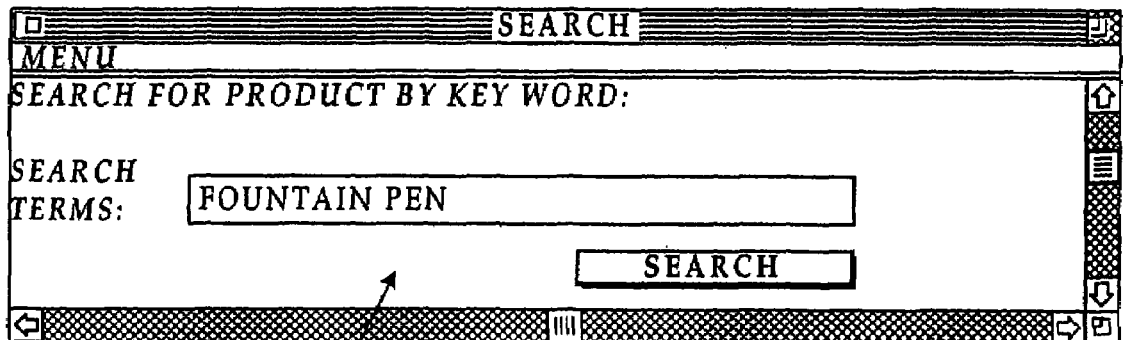
FIGS. 11A-11C and 12A-12B are exemplary webpages illustrating searching and shopping on an e-commerce site.
Figure 11B:
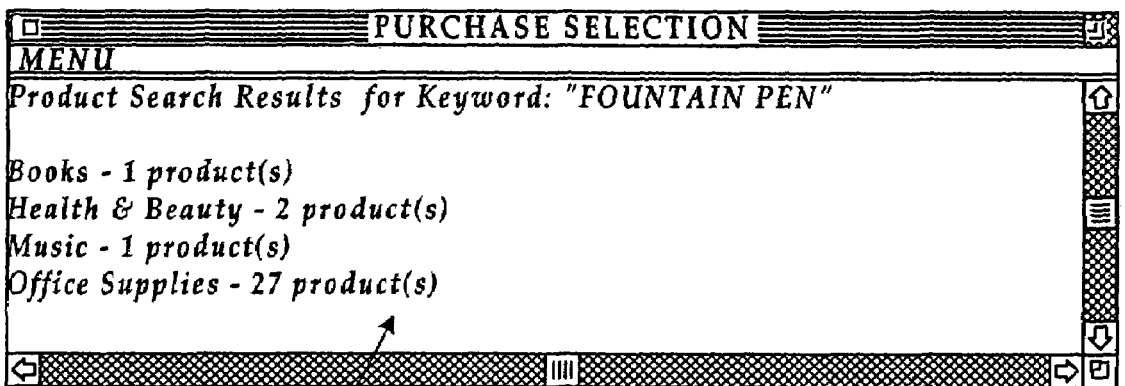
Figure 11C:
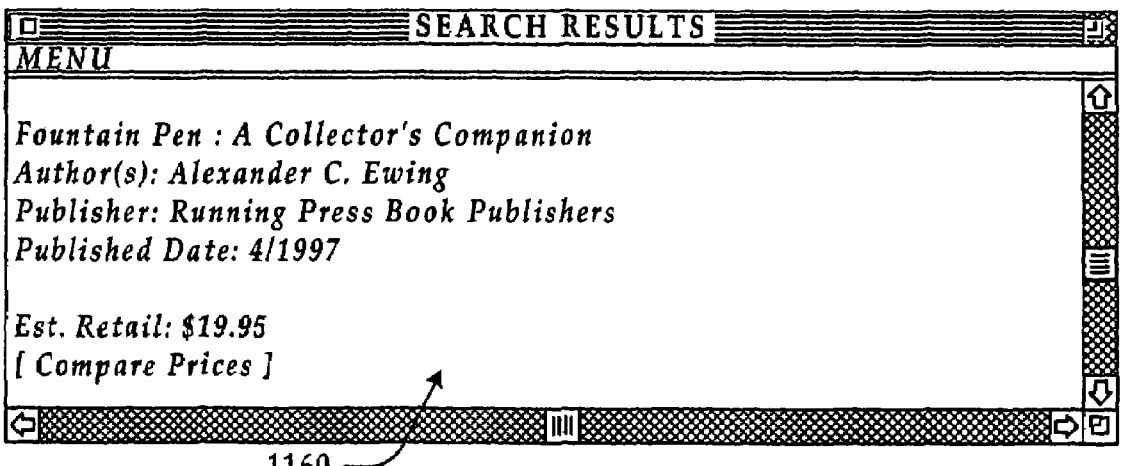

Accordingly, FIG. 10 illustrates one exemplary commercial side system with a number of components. The system 1000 is set up as a load balanced, redundant system with both active and inactive databases in each component. The information from the item table 566 is forwarded to an item price database 1005. The item price database 1005 is updated periodically such as once an hour, once a day, once a week, and so forth; again, preserving the item table as the master source from which the data is received.

An index server 1010 then takes the information in the item price database 1005 and indexes it using conventional keyword and database indexing routines known to those of ordinary skill in the art. The index server supplies index meta-data or data about the index and other index data for the items in the item price database to search servers, such as search servers #1 and #2, 1041 and 1042, shown in FIG. 10. The item price database 1005 also supplies item details, such as descriptions and images that correspond to the information sent by the index server 1010. Note that while search database #1 1041 and search database #2 1042 are being updated, search database #3 1043 and search database #4 1044 are actually online and are in communication with a search server #1 1051 and a search server #2 1052, respectively. This allows search databases #3 and #4, 1043 and 1044 respectively, to remain fully active while search server #1 1041 and search database #2 1042 are being updated. Search databases #1-4 1041-1044 are mirrored databases, which means that when one is finished updating, the updated information is then mirrored to the next. For example, in FIG. 10, once search database #1 1041 is finished receiving index information and item information, search server #3 1043 will be taken offline, and the same information will be added to search server #3.

The load balancing of the illustrated embodiment is handled by the "big IP" server 1060 which is a conventional load balancing server known to those of ordinary skill in the art to allow the communications load to be distributed across components of the present invention. The "big IP" server 1060 is connected via the Internet 100 to the consumer device or devices 300 and merchant servers 205.

Returning back to the databases, the pricing databases #1-4 1031-1034 are in communication with mirrored SQL servers #1 and #2 1021-1022, such that when a consumer has finished searching for items using search server #1 1051 or search server #2 1052, they are then able to retrieve detailed information from pricing databases #1-4 1031-1034. Note again that with SQL #1 and SQL#2, while SQL#1 1021 is being updated from the item price database 1005, SQL #2 1022 is in communication with the pricing databases, and that while pricing database #1 1031 and pricing database #2 1032 are accessible by consumers via the Internet 100, pricing database #3 1033 and pricing database #4 1034 are in communication with SQL database #2 to update their information.

While one possible embodiment is shown here, it need hardly be mentioned that this commercial side of the present invention could have a myriad of other possible configurations, not the least would be a much simpler system where only the item table was used instead of the item price database index server, sequel databases, pricing databases, search databases, and search servers and with no load balancing at all. However, each one of these components does increase either the speed, flexibility, or reliability of the overall system and have been included to illustrate one exemplary embodiment of how the present invention may be implemented.

As will be appreciated by those of ordinary skill in the art, identifying and searching for items can be done in many different ways. For example, in one embodiment of the invention, the consumer enters information about the items into a search engine. Based on the information input into the search engine, a list of items is returned to the consumer on a webpage. In another embodiment of the invention, the search engine may search a database stored on the import server 400 containing a list of currently available items from many different merchants. In another embodiment, the search engine searches external databases that are not contained on the import server 400 but are located on remote computers. As will be appreciated by those of ordinary skill in the art, many different search engines can be used. In yet another embodiment, a classification system is established that divides goods or services into categories of specific types. For example, categories can include, among many others, clothes, books, music, video, jewelry and the like.

Figure 12A:
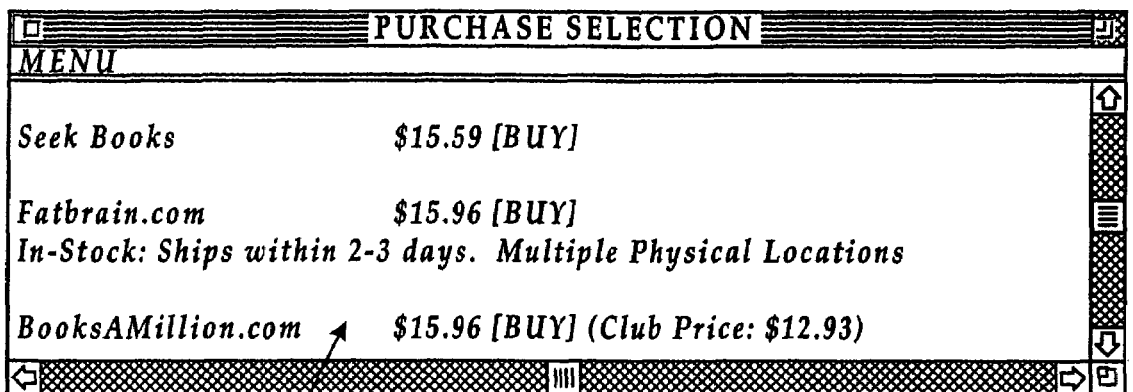
Figure 12B:
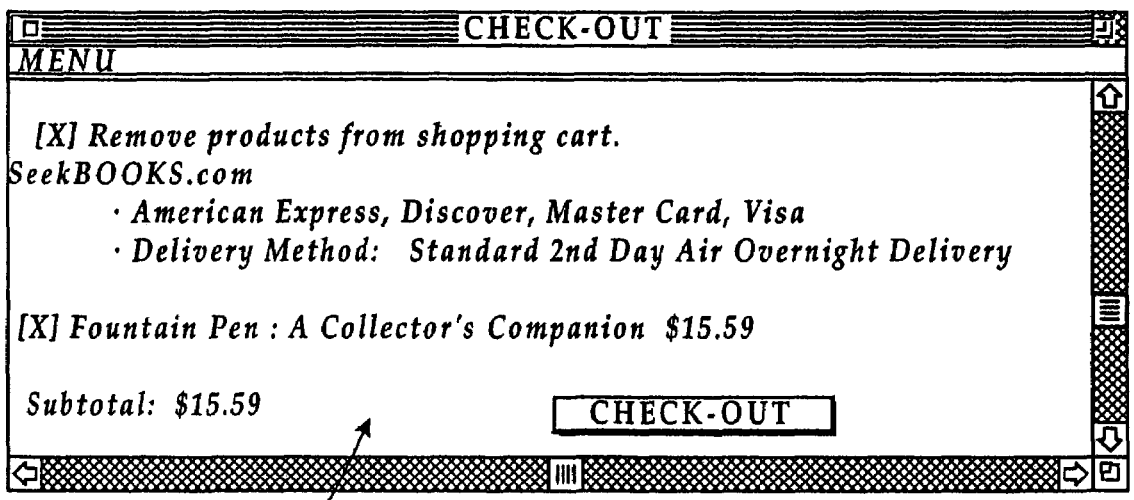

In one embodiment of the present invention, the consumer browses through item search results on a webpage (see FIGS. 1A-11C and description below) provided by a search server 1041, 1042, 1043 or 1044. In another embodiment, the search results are sent electronically to a wireless device, such as a telephone, or PDA. As will be appreciated by those of ordinary skill in the art, wireless devices are more restricted by the amount of information they may display as compared to a personal computer. Therefore, the information sent to the wireless device is formatted for viewing on a wireless device. Well known presentation formats for wireless devices are Handheld Device Markup Language ("HDML") documents and Wireless Markup Language ("WML") documents. As will be appreciated by those skilled in the arts, HDML and WML documents may be viewed on conventional microbrowsers such as phone.com's.TM. UP.link microbrowsers. If the consumer is interested in a particular item, the item may be added to the consumer's shopping cart (see FIGS. 12A and 12B and description below). In one embodiment of the invention, the consumer selects the item by clicking on a hyperlink to add the item to the service. As will be appreciated by those of ordinary skill in the art, there are many methods of selecting an item. For example, a consumer may drag an icon or hyperlink representing the item to an icon or hyperlink representing the shopping cart.

For clarity of illustration, the phrase "item type" will be used to describe a type of merchandise that may be sold by several merchants. For example, an "NEC 17 inch LCD monitor" is an "item type". An "item" may be any good and/or service capable of being exchanged between two or more entities, and the term "item" may be used to describe an item that is carried by a particular merchant. For example, an "NEC 17 inch LCD monitor from Circuit City" is an "item". When a consumer selects an item, both the item type and the merchant may be determined. In addition, an "item identifier" may include, for example, a universal item code (UPC), a stockkeeping unit (SKU), a serial number, a reference number, a category number, a service type indicator, a description and/or other any other information capable of identifying an item. Any reference to an item type, item or item identifier, as used herein, may include one or more item types, items or item identifiers, respectively.

FIGS. 11A-12B illustrate exemplary webpages for searching, viewing and selecting an item in accordance with the present invention. Webpage 1100 illustrates an exemplary webpage form having a field for searching for specific items. The results of an exemplary search are shown in webpage 1130. After selecting a type of item from webpage 1130, a consumer might see a webpage such as exemplary viewing webpage 1160 where the consumer is presented with the detailed description of the selected item along with a link to compare prices and handling details from different merchants webpage 1200 shows a number of different merchants with different prices and/or handling details. Finally, webpage 1260 illustrates a selected item from a particular merchant that is ready to be checked out.

Another aspect of the current invention allows for a more full, accurate and detailed item coverage in the item table. Specifically, the data scrubbing ability of the current invention which is the process of analyzing the item entries which have been placed in the buffer table 564 due to being either uncategorized or unmatched with existing items in the item table 566. Data scrubbing can either be an automatic process or a manual process each of which is reflected in FIG. 13 or 14, respectively.

Figure 13:
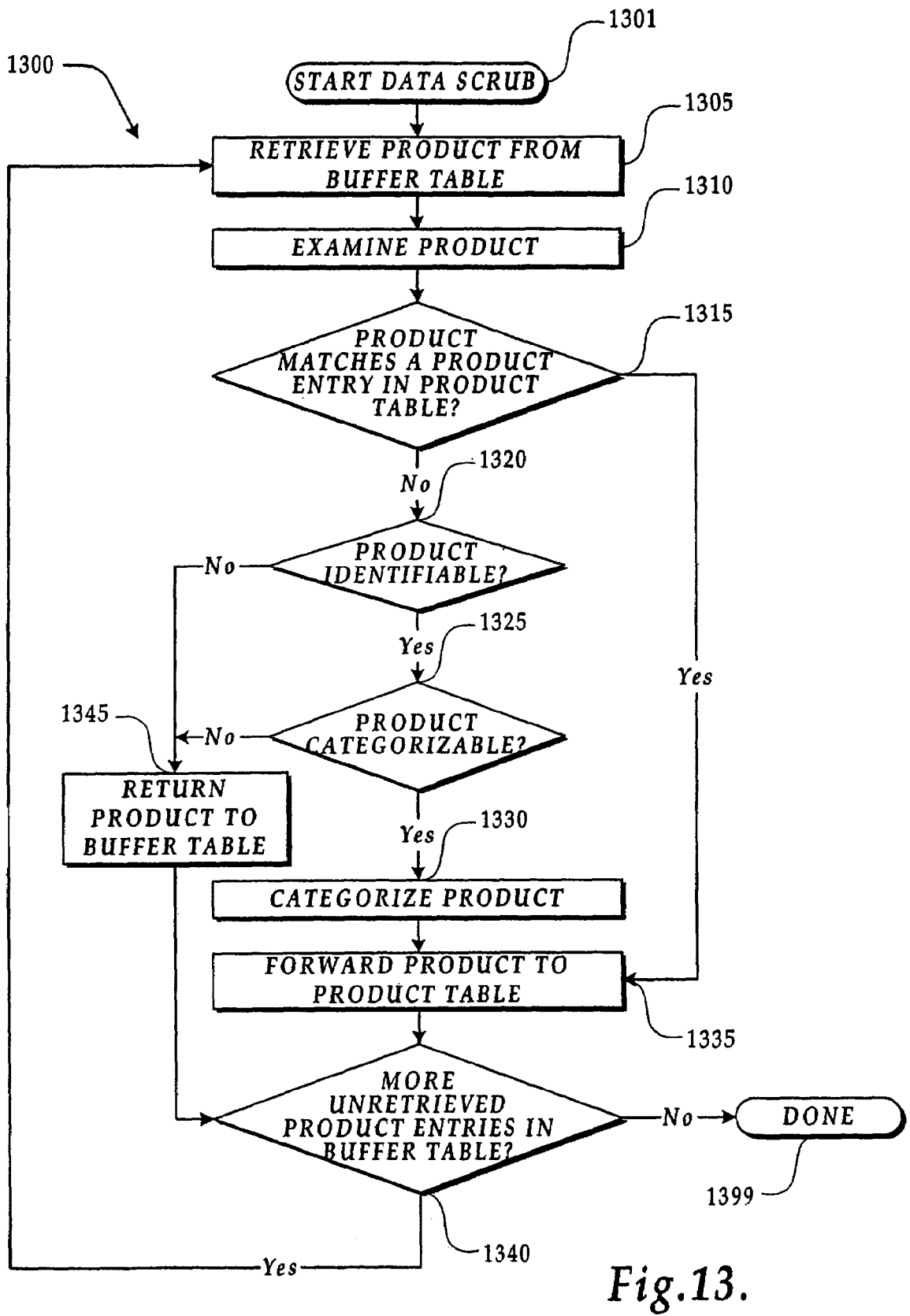
FIG. 13 is a flow chart illustrating an automated data scrub of a buffer table in accordance with the present invention.

FIG. 13 is a flow chart illustrating a routine 1300 for automatic data scrubbing. Routine 1300 starts in block 1301 and proceeds to block 1305 where an item entry is retrieved from the buffer table. In block 1310, the item entry is examined. Then in decision block 1315, if it is found that the item matches the item entry in the item table, it is automatically forwarded to the item table and requires no further scrubbing. However, if in decision block 1315 it was found that the item did not match an entry in the item table, processing continues to decision block 1320 where it is determined if the item is identifiable. Specifically, is this a valid item for which an item entry can be made within the item table? If it is not identifiable, then in block 1345, the item is returned to the buffer table for analysis at a later date or eventual expiration. However, if in decision block 1320 the item is identifiable, then in decision block 1325 it is determined whether the item is categorizable, specifically, if the item will fall into a type of category. One example might be that two separate items might have the same title; however further information would show that they were in different categories. An item title such the name "fountain pen" might be the title of a book or a description of a writing instrument. Therefore, the data scrub routine 1300 looks to additional information to see if there is any indication that the item would fall in one category versus another, e.g., books or office supplies. If the item is categorizable, then processing continues to 1330 where a category is assigned to the item; then, in block 1335 the item is forwarded to the item database 566. If however in decision block 1325 the item is not categorizable, it placed back in the buffer table in block 1345. Finally, in decision block 1340, a determination is made if there are any more unretrieved item entries in the buffer table. If all entries have been retrieved, then processing ends in 1399, otherwise it returns back to block 1305 to continue scrubbing the buffer table.

Figure 14:
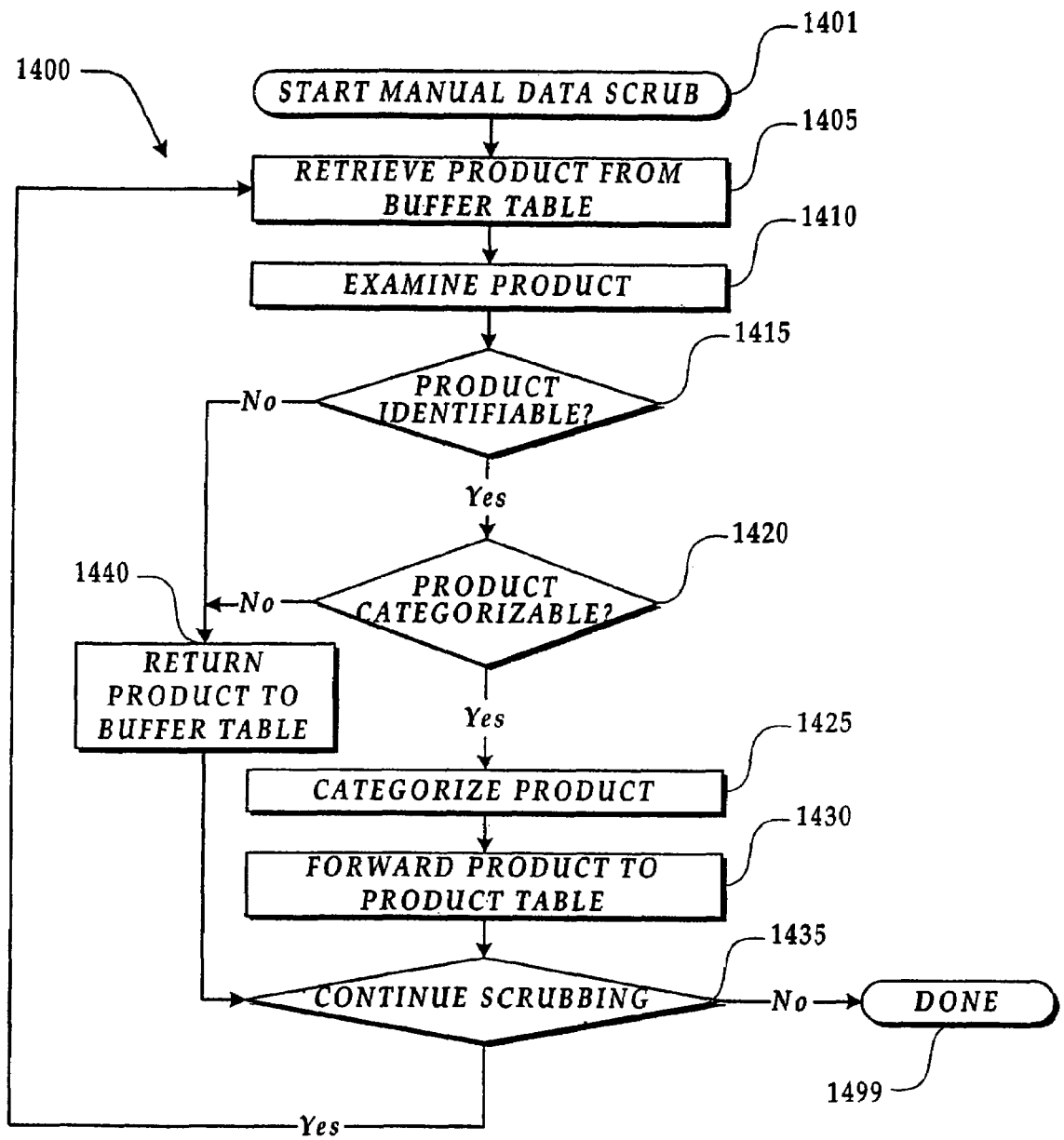
FIG. 14 is a flow chart illustrating a manual data scrub of a buffer table in accordance with the present invention.

Similar to FIG. 13, FIG. 14 is a flowchart illustrating a manual data scrubbing routine 1400. Routine 1400 may start in block 1401 and proceed to block 1405 where an item entry is retrieved from the buffer table. In block 1410, the item entry may examined. Then in decision block 1415, it is determined whether the item is identifiable. Specifically, does the item entry describe a valid item for which an item entry can be made within the item table? If it is not identifiable, then in block 1440, the item is returned to the buffer table for analysis at a later date or eventual expiration. However, if in decision block 1415 the item is determined to be identifiable, then in decision block 1420 it is determined whether the item is categorizable, specifically, if the item will fall into a type of category. If the item is categorizable, then processing continues to 1425 where a category is assigned to the item; then, in block 1430 the item is forwarded to the item database 566. If however in decision block 1420 the item is not categorizable, it placed back in the buffer table 564 (FIG. 5) in block 1440. Finally, in decision block 1435, a determination is made whether to continue scrubbing, if not, then processing ends in 1499, otherwise processing returns back to block 1405 to continue manual scrubbing the buffer table.

Figure 15:
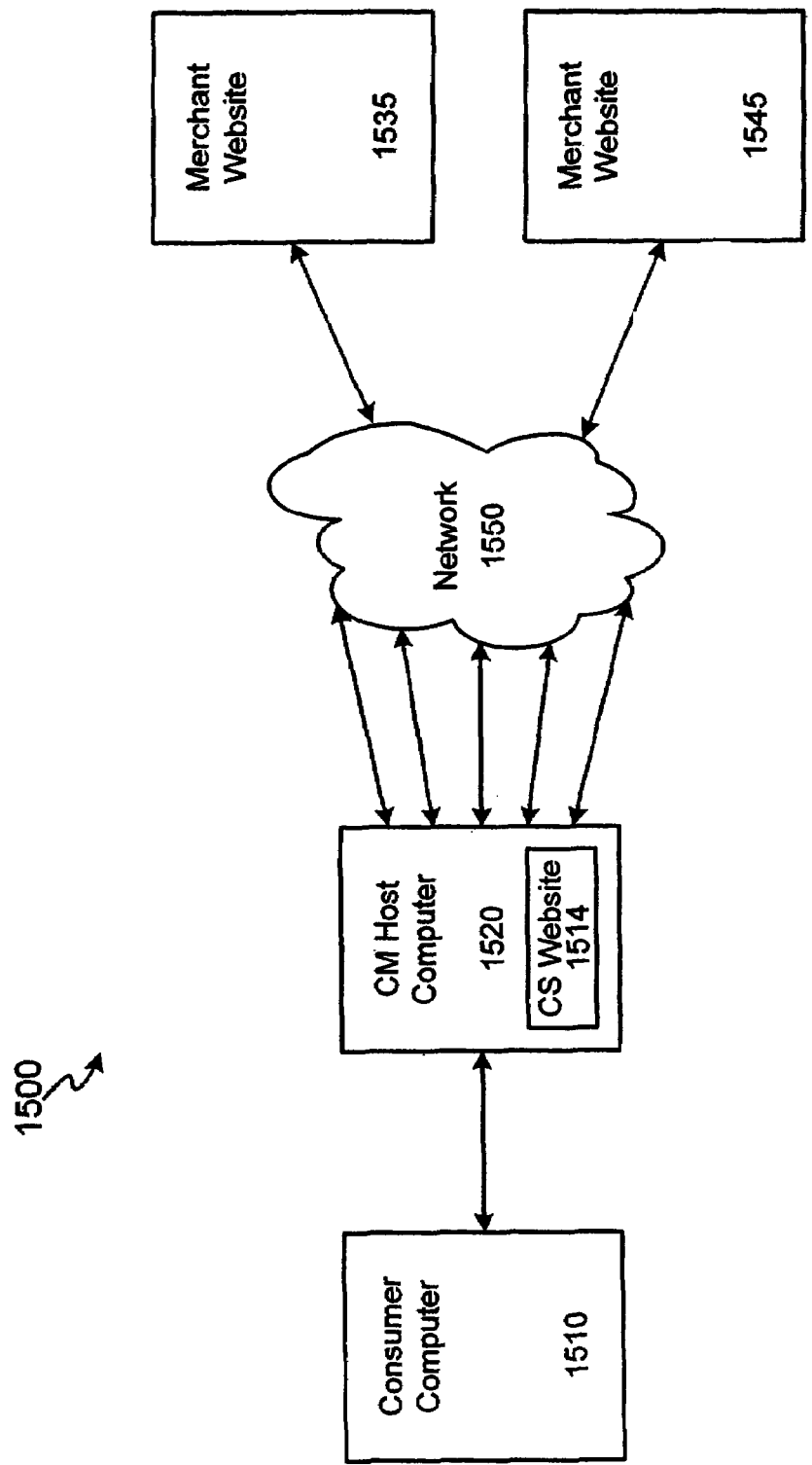
FIG. 15 is a block diagram illustrating an exemplary embodiment of a system to facilitate an on-line purchase of at least one item by a consolidated shopping website.

FIG. 15 is a block diagram illustrating an exemplary embodiment of a system 1500 to facilitate an on-line purchase of at least one item by a consolidated shopping website which purchases the item from a merchant website on behalf of a consumer. In one embodiment, system 1500 may facilitate secure ordering, payment and funding services while substantially protecting the privacy of the transaction participants. System 1500 may also include processes for authenticating participants, facilitating on-line purchases made on behalf of a consumer, and settling payments. As such, embodiments of the invention may enable merchants providing websites to effectively accept an order without changing their current ordering infrastructure.

System 1500 may also include consumer computing device 1510. Consumer computing device 1510 may be any software and/or hardware suitably configured to communicate transaction data to a consolidated merchant (CM) host computer (e.g., CM host computer 1520). In one embodiment, consumer computing device 1510 may be configured to receive transaction data input by a consumer, and transmit a purchase request, which may include transaction data, to at least one CM host computer 1520. As used herein, "transmit" may include sending electronic data from one component to another component of system 1500 over a network connection (e.g., network 1550, discussed below). "Transaction data" may include, for example, at least one item identifier for each item being purchased (e.g., SKU or UPC code), a payment instrument account number, and/or any other data helpful in a purchase request. Additionally, as used herein, "data" may include encompassing information such as commands, queries, files, data for storage, and the like in digital or any other form. A "payment instrument" may include, for example, one or more of a charge card, credit card, debit card, awards card, prepaid card, smart card, magnetic stripe card, bar code card, transponder, RFID, radio frequency card and/or the like having an account number, which cardholders typically present to merchants, as part of a transaction, such as a purchase. However, a consumer may present an account number without the use of a physical payment instrument.

An "account" or "account number", as used herein, may include, for example, any device, code, number, letter, symbol, digital certificate, smart chip, digital signal, analog signal, biometric or other identifier/indicia suitably configured to allow the consumer to access, interact with or communicate with the system (e.g., one or more of an authorization/access code, personal identification number (PIN), Internet code, other identification code, and/or the like). The account number may optionally be located on or associated with a rewards card, charge card, credit card, debit card, prepaid card, embossed card, smart card, magnetic stripe card, bar code card, transponder, radio frequency card or an associated account. System may include or interface with any of the foregoing cards or devices, or a fob having a transponder and RFID reader in RF communication with the fob. Although the present invention may include a fob embodiment, the invention is not to be so limited. Indeed, system 1500 may include any device having a transponder configured to communicate with RFID reader via RF communication. Typical devices may include, for example, a key ring, tag, card, cell phone, wristwatch or any such form capable of being presented for interrogation. Moreover, system 1500, consumer computing device 110 and/or consolidated merchant (CM) host computer 120 (detailed below) may include a "pervasive computing device," which may include a traditionally non-computerized device that is embedded with a computing unit. Examples may include, but are not limited to, watches, Internet enabled kitchen appliances, restaurant tables embedded with RF readers, wallets or purses with imbedded transponders, etc.

The account number may be distributed and stored in any form of plastic, electronic, magnetic, radio frequency, wireless, audio and/or optical device capable of transmitting or downloading data from itself to a second device. A payment instrument account number may be, for example, a sixteen-digit credit card number, although each credit provider has its own numbering system, such as the fifteen-digit numbering system used by American Express. Each company's credit card numbers comply with that company's standardized format such that the company using a sixteen-digit format will generally use four spaced sets of numbers, as represented by the number "0000 0000 0000 0000". The first five to seven digits are reserved for processing purposes and identify the issuing bank, card type, etc. In this example, the last (sixteenth) digit is used as a sum check for the sixteen-digit number. The intermediary eight-to-ten digits are used to uniquely identify the consumer. A merchant account number may be, for example, any number or alpha-numeric characters that identifies a particular merchant for purposes of card acceptance, account reconciliation, reporting, or the like.

In one exemplary embodiment, consumer computing device 1510 may be a personal computer, although other types of computing units may be used including laptops, notebooks, hand held computers, set-top boxes, cellular telephones, touch-tone telephones and the like. Moreover, consumer computing device 1510 may also be a merchant computing unit implemented in the form of a computer-server, although other implementations are contemplated. Thus, consumer computing device 1510 may be in a home or business environment with access to a network (e.g., the Internet). Applicants note that any reference to a single consumer computing device may include one or more consumer computing devices.

Consumer computing device 1510 may also be configured to communicate with CM host computer 1520. An electronic commerce system may be implemented at consumer computing device 1510 and CM host computer 1520. The electronic commerce system may be implemented as computer software modules loaded onto CM host computer 1520 and consumer computing device 1510, and CM host computer 1520 may not require any additional software to participate in online commerce transactions supported by the electronic commerce system. Thus, CM host computer 1520 may be any software and/or hardware suitably configured to facilitate a transaction. In one embodiment, CM host computer 1520 may be configured to process a request to purchase an item received from consumer computing device 1510. Furthermore, CM host computer 1520 may include a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. In addition, though shown as a main frame computer, CM host computer 1520 may be implemented in other forms, such as a mini-computer, a PC server, a network of computers located in the same of different geographic locations, or the like.

CM host computer 1520 may also be configured to store at least one uniform resource locator (URL) for one or more merchant websites (e.g., merchant websites 1535 and/or 1545), and access a merchant website utilizing a stored URL. Furthermore, CM host computer 1520 may be configured to access a webpage for placing an order for an item sold on an accessed webpage. CM host computer 1520 may also be configured to place an order for an item sold on an accessed website and/or webpage. The order may be configured to include a token and/or other type of identifier of CM host computer 1520 to enable the recipient of the order to identify CM host computer 1520 as the source the order. In an exemplary embodiment, CM host computer 1520 may be configured to place an order on behalf of a consumer on the order webpage similar to embodiments described in U.S. Pat. No. 6,490,601 issued to Markus et al., herein incorporated by reference. In addition, CM host computer 1520 may be configured to receive order and/or shipping confirmation from at least one merchant website, and transmit such to a consumer. Moreover, CM host computer 1520 may be configured to transmit and/or receive funds from external devices.

In one exemplary embodiment, CM host computer 1520 may be configured to charge the consumer (and/or a third party, merchant, etc) a transaction fee for requesting an item from a different website for the benefit of a consumer. Furthermore, CM host computer 1520 may be configured to calculate the transaction fee, generally analogous to a sales commission, based on a set amount, a variable amount, random amount, percentage of the purchase amount and/or the like. In one embodiment, the predetermined amount may be an amount per transaction, an amount per ordered item, an amount based on a threshold purchase amount, number of websites where ordering occurs, type of item ordered, payment method, type of payment instrument used, and/or the like. The variable fee may be based on similar criteria as the set amount, but may include incrementally increasing amounts based on pre-determined factors stored within CM host computer 1520. Random fees may be charged for similar criteria as the set fee and variable fee, however, the "randomness" may be determined according to pre-determined factors also stored within CM host computer 1520. CM host computer 1520 may be configured to charge a transaction fee to a consumer transmitting a purchase request via consumer computing device 1510, an affiliated and/or non-affiliated merchant selling the item on a merchant website 1535, a wholesaler of the ordered item, a manufacturer of the ordered item, an issuer of a payment instrument and/or any other entity appropriate to charge a transaction fee for the transaction. In one embodiment, the transaction fee may be included as part of an affiliation agreement between CM host computer 1520 and a merchant website (e.g., merchant website 1535), which may detail how the transaction fee may be charged.

CM host computer 1520, after ordering an item on behalf of a consumer on a merchant website not affiliated with CM host computer 1520, may be configured to notify a non-affiliated (e.g., does not have a pre-existing relationship and/or agreement) merchant website of such, and solicit a transaction fee from the merchant website. The solicitation may include a message suggesting that payment of the transaction fee may result in future orders from CM host computer 1520 and/or may include a message suggesting that non-payment of the transaction fee may result in CM host computer 1520 not making future orders.

CM host computer 1520 may also be configured to offer a rebate for ordering an item from a different website on behalf of a consumer. Furthermore, CM host computer 1520 may be configured to calculate the rebate based on a set amount, a variable amount, random amount, percentage of the purchase amount and/or the like similar to the transaction fee configuration discussed above. The rebate may be offered by CM host computer 1520 to a consumer transmitting a purchase request via consumer computing device 1510 and/or to any other appropriate entity (e.g., a school, church, charitable organization, etc.) in, for example, a fund raiser.

In another embodiment, CM host computer 1520 may be configured to receive a rebate for ordering an item from a different website on behalf of a consumer from a merchant selling the item on a merchant website 1535, a wholesaler of the ordered item, a manufacturer of the ordered item and/or any other entity offering a rebate to CM host computer 1520 for facilitating the transaction for factors similar to those discussed above, including an affiliation agreement. Moreover, CM host computer 1520, after ordering an item on behalf of a consumer on a merchant website not affiliated with CM host computer 1520, may be configured to notify the merchant website of such, and include a request for a rebate from the merchant website, along with a message, similar to transaction fee embodiments discussed above.

CM host computer 1520 may be configured to charge a listing fee for displaying an item from other websites (e.g., merchant website 1535) on a website (e.g., consolidated shopping website 1514, hereinafter CS website 1514) provided by CM host computer 1520. The listing fee may be charged to a merchant selling an item, a wholesaler or broker of an item, a manufacturer of an item and/or any other entity desiring an item be displayed on the website.

CM host computer 1520 may also be configured to automatically generate an electronic or paper receipt. In one embodiment, the receipt may be consolidated and may be configurable, such as for batch processing purposes. The consolidation may be across multiple accounts which may be applicable with, for example, corporate accounts. CM host computer 1520 may issue an end of year statement for a consumer as receipt tracking. In one embodiment, CM host computer 1520 may archive in a database a ROC (receipt of charge) associated with a charge account. As such, the additional ROC information along with the statements from CM host computer 1520 provide added value. CM host computer 1520 may charge the consumer a fee for the archival services or any other services discussed herein. In one embodiment, CM host computer 1520 may periodically supply line item detail statements, for example, at the end of the year, wherein the statement discloses each purchase. The service may only be available for certain levels of consumers or certain levels of payment instruments (e.g., Gold and Platinum cards). Furthermore, any charges may be paid directly out of an account using existing or customized stored value systems.

CM host computer 1520 may additionally be configured to generate a report detailing transactions occurring within a specified period of time. Reporting may include similar technology and systems as are known in the art for corporate payment instrument reporting. For example, the administrator of CM host computer 1520 may have a reporting relationship at the consumer level and/or corporate level. The consumer level may include monthly statements sent out to the consumer. The statements may be in electronic (e.g., XMS) or paper (e.g., international) form. The statements may detail merchant, date, time, and/or amount. In one embodiment, the statements may omit consumer components of the transaction. At the corporate level, the system may help corporations manage their expense base with, for example, logistics, reporting tools, etc. A degree of flexibility may exist as to how the corporation desires to manage accounts. For example, a corporation may settle the account directly and be responsible for reviewing the eligibility of each charge. CM host computer 1520 may help the corporation manage their expense base by reporting on the nature of the transactions over a certain period of time (e.g., quarterly, annually, etc). The report may include information such as, for example, certain expenses represent x % of their expense base and are split across six suppliers. As such, if they were to establish a preferred supplier arrangement with for example, three widget manufacturers, they may reduce their expense base. To maintain privacy, CM host computer 1520 may customize the reporting so as to firewall certain detail, but still release sufficient information to make it valuable for expense base tracking and management.

In an exemplary embodiment, CM host computer 1510 may provide a website, using any software and/or hardware suitably configured to accept and process an order for an item. Furthermore, CS website 1514 may be configured to receive a purchase request for an item from a consumer, the item being available for purchase on a different website that may or may not have an affiliation with CS website 1514. CS website 1514 may also be configured to allow consumers to create and store a consumer profile accessible by CS website 1514 and/or the consumer. A "consumer profile" may be created and accessed (e.g., by inputting a user ID and PIN) similar to consumer profile embodiments known in the art. Moreover, a consumer profile may include, for example, the consumer's name, contact information (e.g., mailing address, telephone number, email address, etc.), payment instrument account information, shopping habits, transaction history, consumer profile account information, and/or any other information helpful in facilitating an on-line transaction. Moreover, CS website 1514 may be a stand-alone Internet website or a punchout site that interfaces with e-commerce applications (e.g., Ariba Buyer or SAP).

CS website 1514 may also display an item capable of being purchased from at least one merchant website (e.g., merchant website 1535 and/or 1545) via CS website 1514. The terms "display" and/or "displayed" may include any pictorial, alphanumeric, symbolic, electronic, item identifier, and/or any other representation of an item capable of being perceived by a consumer, including the item itself. An item identifier may be provided directly from a merchant selling the item, a wholesaler and/or the manufacturer of the item in a variety of file formats (.xls, .csv, .txt, .xml, etc.) for items displayed on CS website 1514. In one embodiment, CS website 1514 may be configured to display multiple items capable of being purchased from more than one merchant website 1535. CS website 1514 may also be configured to allow consumers to browse and/or search for items displayed on CS website 1514. CS website 1514 may be configured to communicate with one or more merchant websites 1535 (both affiliated and non-affiliated) via a network 1550.

Network 1550 may include, for example, any electronic communication means which incorporates both hardware and software components of such. Communication among the devices in accordance with the present invention may be accomplished through any suitable communication channels, such as, for example, a telephone network, an extranet, an intranet, Internet, point of interaction device (point of sale device, personal digital assistant, cellular phone, kiosk, etc.), online communications, satellite communications, off-line communications, wireless communications, transponder communications, local area network (LAN), wide area network (WAN), networked or linked devices, keyboard, mouse and/or any suitable communication or data input modality. Moreover, although the invention is frequently described herein as being implemented with TCP/IP communications protocols, the invention may also be implemented using IPX, Appletalk, IP-6, NetBIOS, OSI or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference. Moreover, system 1500 contemplates the use, sale or distribution of an item or information over any network having similar functionality described herein.

Merchant website 1535 may be any software and/or hardware suitably configured to sell items. Merchant website 1535 may be configured to accept and/or process an order for an item sold by the seller and/or manufacturer, and transmit order and/or shipping confirmation to CS website 1514. In one embodiment, merchant website 1535 may be affiliated with CS website 1535 and configured to detect a token and/or other identifier of CM host computer 1520 as the source of an order and transmit funds (e.g., a transaction fee and/or rebate) to CM host computer 1520 upon receipt of such. As used herein, the term "merchant website" may include, for example, a website of a seller, wholesaler and/or manufacturer of an item, and any reference made herein to a merchant website (e.g., merchant website 1535) may also include at least one additional merchant website (e.g., merchant website 1545). Merchant website 1535 may be configured to communicate with CS website 1514 via network 1550.

System 1500 may also be configured such that each device (e.g., consumer computing device 1510, CM host computer 1520, merchant website 1535 and merchant website 1545) is interconnected via a second network, referred to as a payment network. The payment network, which may be part of certain transactions, represents existing proprietary networks that presently accommodate transactions for credit cards, debit cards, and other types of financial/banking cards. The payment network is a closed network that is assumed to be secure from eavesdroppers. Exemplary transaction networks may include the American Express®, VisaNet® and the Veriphone® networks.

Various databases used herein may include, for example, client data;

merchant data; financial institution data; and/or like data useful in the operation of system 1500. As those skilled in the art will appreciate, a user computer may include an operating system (e.g., Windows NT, 95/98/2000, OS2, UNIX, Linux, Solaris, MacOS, etc.) as well as various conventional support software and drivers typically associated with computers. The computer may also include any suitable personal computer, network computer, workstation, minicomputer, mainframe or the like. A user computer may be in a home or business environment with access to a network. In an exemplary embodiment, access is through a network or the Internet through a commercially available web-browser software package.

Any databases discussed herein may be any type of database, such as relational, hierarchical, graphical, object-oriented, and/or other database configurations. Common database items that may be used to implement the databases include DB2 by IBM (White Plains, N.Y.), various database items available from Oracle Corporation (Redwood Shores, Calif.), Microsoft Access or Microsoft SQL Server by Microsoft Corporation (Redmond, Wash.), or any other suitable database item. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one aspect of the present invention, any suitable data storage technique may be utilized to store data without a standard format. Data sets may be stored using any suitable technique, including, for example, storing consumer files using an ISO/IEC 7816-4 file structure; implementing a domain whereby a dedicated file is selected that exposes one or more elementary files containing one or more data sets; using data sets stored in consumer files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/

IEC 8824 and 8825; and/or other proprietary techniques that may include fractal compression methods, image compression methods, etc.

In one exemplary embodiment, the ability to store a wide variety of information in different formats is facilitated by storing the information as a BLOB. Thus, any binary information can be stored in a storage space associated with a data set. As discussed above, the binary information may be stored on the financial payment instrument or external to but affiliated with the financial payment instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with the financial payment instrument by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments of the present invention, the data can be stored without regard to a common format. However, in one exemplary embodiment of the present invention, the data set (e.g., BLOB) may be annotated in a standard manner when provided for manipulating the data onto the financial payment instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain consumers, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a stand alone interaction device configured to add, delete, modify, or augment the data in accordance with the header or trailer. As such, in one embodiment, the header or trailer is not stored on the transaction device along with the associated issuer-owned data but instead the appropriate action may be taken by providing to the payment instrument user at the stand alone device, the appropriate option for the action to be taken. The present invention may contemplate a data storage arrangement wherein the header or trailer, or header or trailer history, of the data is stored on the payment instrument in relation to the appropriate data.

One skilled in the art will also appreciate that, for security reasons, any databases, systems, devices, servers or other devices of system 1500 may consist of any combination thereof at a single location or at multiple locations, wherein each database or system includes any of various suitable security features, such as firewalls, access codes, encryption, decryption, compression, decompression, and/or the like.

System 1500 may be described herein in terms of functional block components and various processing steps. It should be appreciated that such functional blocks may be realized by any number of hardware and/or software components configured to perform the specified functions. For example, system 1500 may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, C++, Java, COBOL, assembler, PERL, Visual Basic, SQL Stored Procedures, extensible markup language (XML), with the various algorithms being implemented with any combination of data structures, objects, processes, routines or other programming elements. Further, it should be noted that the present invention may employ any number of conventional techniques for data transmission, signaling, data processing, network control, and the like. Still further, system 1500 may be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

As will be appreciated by one of ordinary skill in the art, system 1500 may be embodied as a customization of an existing system, an add-on item, upgraded software, a stand-alone system, a distributed system, a method, a data processing system, a device for data processing, and/or a computer program item. Accordingly, system 1500 may take the form of an entirely software embodiment, an entirely hardware embodiment, or an embodiment combining aspects of both software and hardware. Furthermore, system 1500 may take the form of a computer program item on a computer-readable storage medium having computer-readable program code means embodied in the storage medium. Any suitable computer-readable storage medium may be utilized, including hard disks, CD-ROM, optical storage devices, magnetic storage devices, and/or the like.

The present invention is described herein with reference to block diagrams and flowchart illustrations of methods, apparatus (e.g., systems), and computer program items according to various aspects of the invention. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flow diagram illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

Figure 16:
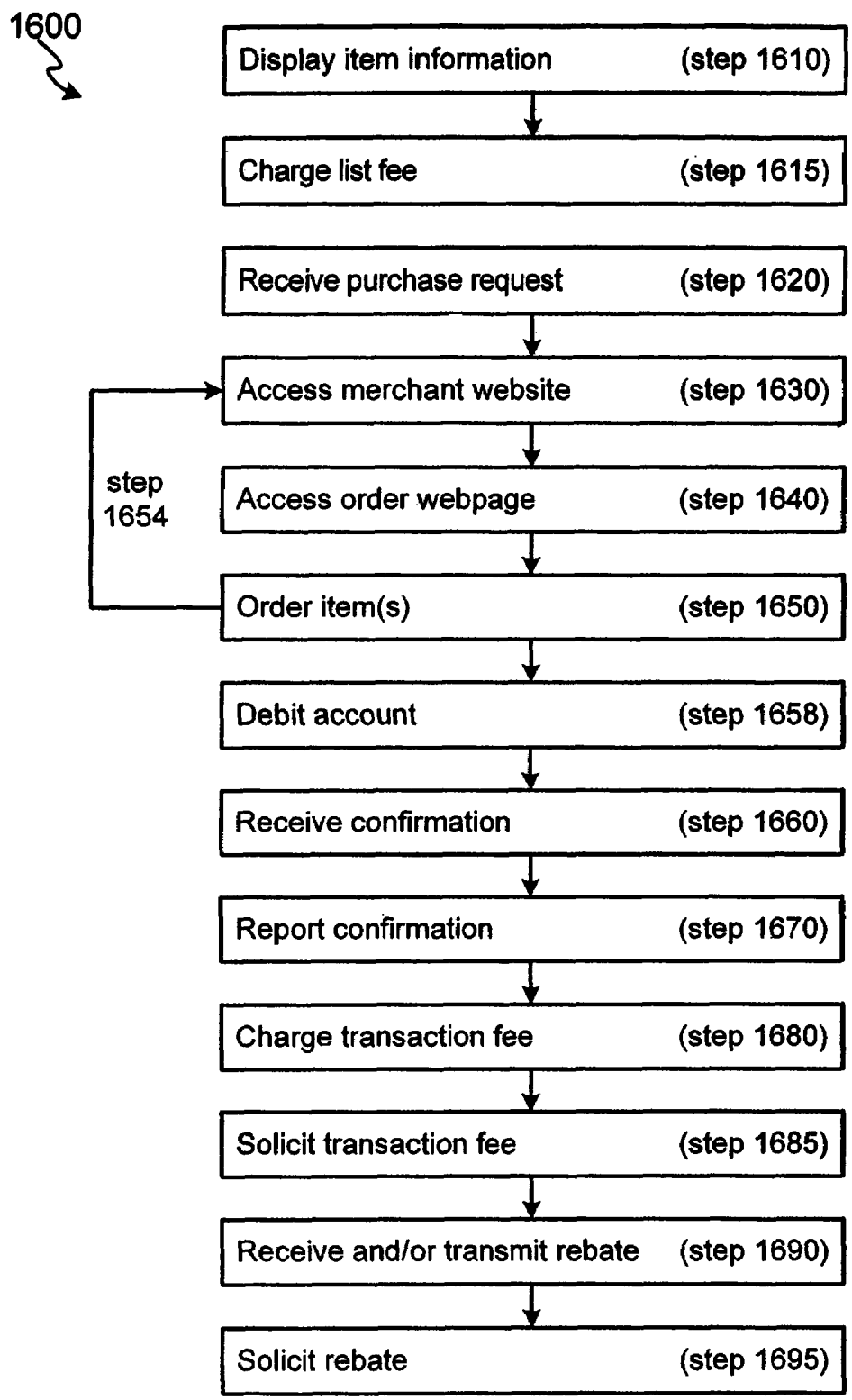
FIG. 16 is a block diagram illustrating one exemplary embodiment of a method to facilitate an on-line purchase of at least one item by a consolidated shopping website.

FIG. 16 is a block diagram illustrating an exemplary embodiment of a method 1600 to facilitate an on-line purchase of at least one item on behalf of a consumer by a consolidated shopping website. CM host computer (e.g., CM host computer 1520) displays item information for an item on a CS website (e.g., CS website 1514) provided by CM host computer 1520 that is capable of being purchased on a different merchant website (e.g., merchant websites 1535 and/or 1545) (step 1610). CM host computer 1520 may charge an entity requesting the item be displayed on CS website 1514 a listing fee for displaying the item (step 1615).

In one exemplary embodiment, CM host computer 1520 may receive a request from a consumer computing device (e.g., consumer computing device 1520) via CS website 1514 to purchase an item displayed on CS website 1514 (step 1620). The request may then be scrubbed, denormalized, normalized and enriched with additional content (e.g., images, short description, long description, features, attributes, etc.). The enriched data may be obtained via the supplier, manufacturer, and/or data warehouses (e.g., CNET). The request may include transaction data and/or information related to the consumer (e.g., name, contact information (e.g., shipping address, telephone number, email address, etc.), payment instrument account information, etc.) input by the consumer at the time of the request. In another embodiment, the request may include transaction data and consumer information stored in a consumer profile accessible by CS website 1514.

With the transaction data and consumer information, CM host computer 1520 may access a merchant website (e.g., merchant website 1535 and/or 1545) that sells the item the consumer wishes to purchase (step 1630), and locate a webpage used for receiving orders (step 1640). In one embodiment, CM host computer 1520 may automatically access merchant website 1535 after the purchase request from the consumer is received or access merchant website 1535 in real-time. Applicants note that due to various possible configurations of merchant websites, steps 1630 and 1640 may be performed simultaneously (e.g., when the order webpage is included in the first page accessed on a merchant website).

On an order webpage, CM host computer 1520 may order the requested item on behalf of the consumer (step 1650). In one exemplary embodiment, CM host computer 1520 may repeat steps 1630, 1640 and/or 1650 multiple times when a single purchase request includes at least one item from each of two or more different merchant websites (step 1654).

When ordering an item, CM host computer 1520 may enter the transaction data and consumer information in the appropriate field(s) on the order webpage. In an exemplary embodiment, CM host computer 1520 may inject the transaction data and/or consumer information in the appropriate fields according to the methods described in, for example, U.S. Pat. No. 6,490,601.

In one embodiment, payment instrument account information included in the transaction data may be consumer payment instrument account information, and the consumer's payment instrument account may be debited by each merchant website for the amount purchased on that particular merchant website. In another embodiment, CM host computer 1520 may order the item on behalf of the consumer utilizing payment instrument account information for CM host computer 1520. In this embodiment, CM host computer's 1520 payment instrument account may be debited by each merchant website for the amount purchased at each merchant website, and CM host computer 1520 may subsequently cause to be debited a financial account of the consumer for the entire purchase amount, or for each individual amount debited by each merchant website 1535 (step 1658).

CM host computer 1520 may receive an order and/or shipping confirmation from the merchant website when the item has been successfully ordered and/or shipped (step 1660). In addition, CM host computer 1520 may report to the consumer the transaction information, order confirmation (independently of, or once the item(s) has/have been successfully ordered), and/or shipping confirmation once shipping confirmation from the merchant is received (step 1670).

In one exemplary embodiment, CM host computer 1520 may charge a transaction fee for placing the order with merchant website 1535 (step 1680). The transaction fee may be a set amount, a variable amount, random amount, percentage of the transaction and/or the like, and may be charged to the consumer, merchant website 1535, a wholesaler of the ordered item, a manufacturer of the ordered item and/or an issuer of the payment instrument used to place the order similar to the discussion above. In the case of a non-affiliated merchant website 1535, CM host computer 1520 may solicit a transaction fee from an entity by including a message suggesting that future orders may or may not be placed, and/or a payment instrument may of may not be used depending on whether the transaction fee is paid (step 1685).

Furthermore, CM host computer 1520 may offer and/or receive a rebate when placing the order (step 1690). The rebate may come from merchant website 1535, a wholesaler of the ordered item, a manufacturer of the ordered item and/or an issuer of the payment instrument used to place the order. A rebate may be initiated by CM host computer 1520 soliciting entities for a rebate similar to transaction fee embodiments discussed above in step 1685 (step 1695). A rebate may be offered to the consumer for using system 1500 to make the purchase request and/or may be part of a fundraiser, causing a financial account (not shown) of a school, church, research program, charity and/or any other designated entity to be credited.

Applicants note that the present invention has been described in the consumer-to-merchant context in which the consumer orders items from merchants or suppliers. The present invention may also be applied to a business-to-business e-commerce context to allow non-consumer entities to purchase goods and/or services.

Benefits, other advantages, and solutions to problems have been described herein with regard to specific embodiments. However, the benefits, advantages, solutions to problems, and any element(s) that may cause any benefit, advantage, or solution to occur or become more pronounced are not to be construed as critical, required, or essential features or elements of any or all the claims or the invention. The scope of the present invention is accordingly to be limited by nothing other than the appended claims, in which reference to an element in the singular is not intended to mean "one and only one" unless explicitly so stated, but rather "one or more." Further, no element described herein is required for the practice of the invention unless expressly described as "essential" or "critical".

We claim:

1. A computer-implemented method to facilitate an on-line purchase of an item on behalf of a consumer, said method comprising:
   receiving a product feed from a source, wherein said source is at least one of: a supplier and provider;
   extracting an image from said product feed when said source is said supplier;
   retrieving an image from a web site associated with said provider when said source is said provider;
   creating a normalized product feed from said product feed such that said supplier feed and said provider feed are in the same format;
   storing said image and said product feed in a database, wherein said database includes product data from a plurality of web sites;
   displaying said product data including said images from said plurality of web sites, wherein said product data is displayed at a single Uniform Resource Locator;
   receiving a request to purchase said item from among product data, wherein said request includes order data entered into a first electronic form of a first website by said consumer and, wherein, said request is received at said first website of a host computer;
   placing an order, by said host computer, for said item on a second website by automatically inserting said order data into a second electronic form of said second website without redirecting said consumer to said second website, wherein said second website offers said item for sale; and
   charging a transaction fee to said second website used for placing said order.

2. The computer-implemented method of claim 1, wherein said transaction fee is at least one of a set fee, a random fee, and a variable fee.

3. The computer-implemented method of claim 1, wherein said step of charging a transaction fee comprises charging a set transaction fee based on at least one of a number of items purchased, a purchase amount, number of websites where said ordering occurs, type of item purchased, payment method, type of payment instrument and per transaction.

4. The computer-implemented method of claim 1, wherein said step of charging a transaction fee comprises charging a variable transaction fee based on at least one of a number of items purchased, a purchase amount, number of websites where said ordering occurs, type of item purchased, payment method, type of payment instrument, per transaction and a percentage.

5. The computer-implemented method of claim 1, further comprising displaying information on said first website related to said item, wherein said item is capable of being ordered on said second website.

6. The computer-implemented method of claim 1, further comprising charging a listing fee from at least one of said second website, a wholesaler and a manufacturer of said item.

7. The computer-implemented method of claim 1, wherein said step of charging a transaction fee comprises charging an affiliated merchant website said transaction fee.

8. The computer-implemented method of claim 1, wherein said step of charging a transaction fee comprises charging a non-affiliated merchant website said transaction fee, wherein said non-affiliated merchant website is solicited for said transaction fee.

9. The computer-implemented method of claim 1, further comprising at least one of receiving and offering a rebate for placing said order.

10. The computer-implemented method of claim 1, further comprising receiving a rebate from at least one of said second website, a wholesaler of said at least one item, a manufacturer of said at least one item and an issuer of a payment instrument.

11. The computer-implemented method of claim 1, further comprising offering a rebate to at least one of a consumer, a school, a church, a research facility and a charitable organization.

12. The computer-implemented method of claim 1, further comprising offering a rebate which is at least one of a set fee, a random fee, and a variable fee.

13. The computer-implemented method of claim 1, further comprising offering a set rebate based on at least one of a number of items purchased, a purchase amount, number of websites where said ordering occurs, type of item purchased, payment method, type of payment instrument and per transaction.

14. A machine-readable medium having stored thereon a plurality of instructions, said plurality of instructions when executed by a processor, cause said processor to perform a method comprising the steps of:
   receiving a product feed from a source, wherein said source is at least one of: a supplier and provider;
   extracting an image from said product feed when said source is said supplier;
   retrieving an image from a web site associated with said provider when said source is said provider;

creating a normalized product feed from said product feed such that said supplier feed and said provider feed are in the same format;

storing said image and said product feed in a database, wherein said database includes product data from a plurality of web sites;

displaying said product data including said images from said plurality of web sites, wherein said product data is displayed at a single Uniform Resource Locator;

receiving a request to purchase said item from among product data, wherein said request includes order data entered into a first electronic form of a first website by said consumer and, wherein, said request is received at said first website of a host computer;

placing an order, by said host computer, for said item on a second website by automatically inserting said order data into a second electronic form of said second website without redirecting said consumer to said second website, wherein said second website sells said item; and at least one of charging a transaction fee, receiving a rebate, charging a listing fee, and offering a rebate by said host computer to said second website.

15. A computer-implemented method to facilitate an on-line purchase of an item on behalf of a consumer, said method comprising:

receiving a product feed from a source, wherein said source is at least one of: a supplier and provider;

extracting an image from said product feed when said source is said supplier;

retrieving an image from a web site associated with said provider when said source is said provider;

creating a normalized product feed from said product feed such that said supplier feed and said provider feed are in the same format;

storing said image and said product feed in a database, wherein said database includes product data from a plurality of web sites;

displaying said product data including said images from said plurality of web sites, wherein said product data is displayed at a single Uniform Resource Locator;

receiving a request to purchase said item from among product data, wherein said request includes order data entered into a first electronic form of a first website by said consumer and, wherein, said request is received at said first website of a host computer;

placing an order, by said host computer, for said item on a second website by automatically inserting said order data into a second electronic form of said second website without redirecting said consumer to said second website, wherein said second website offers said item for sale;

placing a second order, by said host computer, for a second item on a third website by automatically inserting order data into an electronic form of said third website without redirecting said consumer to said third website, wherein said third website offers said second item for sale, and wherein said first website, said second website, and said third website are each different website; and at least one of charging a transaction fee, receiving a rebate, charging a listing fee, and offering a rebate by said host computer to said second or said third website.

16. The computer-implemented method of claim 1, wherein said order data is retrieved from a personal profile that is associated with said consumer.

17. The computer-implemented method of claim 1, further comprising parsing said normalized data feed and said image into categorized data elements to determine when a category exists in a product table which corresponds to said categorized data elements, wherein said categorized data elements are added to a buffer table when said category does not exist and said categorized data elements are integrated with said product data within said product table when said category exists to create integrated data.

18. The computer-implemented method of claim 17, further comprising providing said integrated data to a user such that said user may utilize a single shopping website to search for, compare prices and order said products, wherein said products are associated with said stored product data from said plurality of websites, wherein each of said plurality of websites may be associated with a different provider.

* * * * *